(12) United States Patent
Baik

(10) Patent No.: US 11,774,717 B2
(45) Date of Patent: Oct. 3, 2023

(54) LENS MODULE

(71) Applicant: Samsung Electro-Mechanics Co., Ltd., Suwon-si (KR)

(72) Inventor: Jae Hyun Baik, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 475 days.

(21) Appl. No.: 16/990,070

(22) Filed: Aug. 11, 2020

(65) Prior Publication Data

US 2020/0371317 A1    Nov. 26, 2020

Related U.S. Application Data

(60) Division of application No. 16/281,294, filed on Feb. 21, 2019, now Pat. No. 11,353,685, which is a
(Continued)

(30) Foreign Application Priority Data

Oct. 14, 2013  (KR) .................. 10-2013-0122193
Jan. 23, 2014  (KR) .................. 10-2014-0008211

(51) Int. Cl.
*G02B 13/00*      (2006.01)
*G02B 13/18*      (2006.01)
(Continued)

(52) U.S. Cl.
CPC .......... *G02B 13/0045* (2013.01); *G02B 9/64* (2013.01); *G02B 13/18* (2013.01); *G02B 27/0025* (2013.01)

(58) Field of Classification Search
CPC ...... G02B 13/0045; G02B 9/64; G02B 13/18; G02B 27/0025
See application file for complete search history.

(56) References Cited

U.S. PATENT DOCUMENTS 8,385,008 B2   2/2013  Hsieh et al.
8,599,495 B1  12/2013  Tsai et al.
(Continued)

FOREIGN PATENT DOCUMENTS

CN    101833162 A    9/2010
CN    202710833 U    1/2013
(Continued)

OTHER PUBLICATIONS

Chinese Office Action dated Jun. 2, 2016 in counterpart Chinese Application No. 201410214964.6 (8 pages in English, 7 pages in Chinese).
(Continued)

*Primary Examiner* — Ephrem Z Mebrahtu
(74) *Attorney, Agent, or Firm* — NSIP Law

(57) ABSTRACT

A lens module may include a first lens having positive refractive power, a second lens having refractive power, a third lens having positive refractive power, a fourth lens having refractive power, a fifth lens having refractive power, a sixth lens having refractive power, and a seventh lens having negative refractive power. An inflection point may be formed on an image-side surface of the sixth lens. A turning point may be formed on an image-side surface of the seventh lens. The first lens, the second lens, the third lens, the fourth lens, the fifth lens, the sixth lens and the seventh lens are disposed in a sequential order from the first lens to the seventh lens.

20 Claims, 21 Drawing Sheets

Related U.S. Application Data continuation of application No. 15/211,493, filed on Jul. 15, 2016, now Pat. No. 10,241,300, which is a division of application No. 14/264,963, filed on Apr. 29, 2014, now Pat. No. 10,018,805.

(51) Int. Cl.
*G02B 9/64* (2006.01)
*G02B 27/00* (2006.01)

(56) References Cited

U.S. PATENT DOCUMENTS

| | | | |
|---|---|---|---|
| 8,717,685 | B2 | 5/2014 | Tsai et al. |
| 9,383,553 | B2 | 7/2016 | Shinohara et al. |
| 9,435,986 | B2 | 9/2016 | Tsai et al. |
| 2004/0228009 | A1 | 11/2004 | Kamo et al. |
| 2010/0231781 | A1 | 9/2010 | Lee |
| 2012/0026606 | A1 | 2/2012 | Lee et al. |
| 2012/0127588 | A1 | 5/2012 | Lin et al. |
| 2012/0212836 | A1 | 8/2012 | Hsieh et al. |
| 2013/0050846 | A1* | 2/2013 | Huang .................. G02B 1/041 359/713 |
| 2013/0329306 | A1 | 12/2013 | Tsai et al. |
| 2014/0009843 | A1* | 1/2014 | Tsai .................. G02B 9/64 359/708 |
| 2014/0043694 | A1 | 2/2014 | Tsai et al. |
| 2014/0139719 | A1* | 5/2014 | Fukaya .................. G02B 9/64 348/340 |
| 2014/0160580 | A1 | 6/2014 | Nishihata et al. |
| 2014/0376105 | A1 | 12/2014 | Sekine |
| 2015/0009578 | A1* | 1/2015 | Shinohara .................. G02B 9/64 359/708 |
| 2015/0070783 | A1 | 3/2015 | Hashimoto |
| 2015/0198787 | A1 | 7/2015 | Kubota et al. |
| 2015/0198791 | A1 | 7/2015 | Kubota et al. |
| 2015/0212298 | A1 | 7/2015 | Shinohara et al. |
| 2015/0247990 | A1 | 9/2015 | Kubota et al. |
| 2015/0316751 | A1 | 12/2015 | Sekine |
| 2017/0254989 | A1 | 9/2017 | Tsai et al. |
| 2018/0267275 | A1 | 9/2018 | Fukaya |
| 2020/0103623 | A1* | 4/2020 | Sekine .................. G02B 13/0045 |

FOREIGN PATENT DOCUMENTS

| | | |
|---|---|---|
| CN | 202720379 U | 2/2013 |
| CN | 202886713 U | 4/2013 |
| CN | 202886720 U | 4/2013 |
| EP | 2090914 A1 | 8/2009 |
| JP | 2011-112955 A | 6/2011 |
| JP | 2011-112957 A | 6/2011 |
| JP | 2012-155223 A | 8/2012 |
| JP | 2012-220654 A | 11/2012 |
| KR | 10-2011-0071807 A | 6/2011 |
| TW | 201235732 A1 | 9/2012 |
| TW | 201239446 A1 | 10/2012 |
| TW | 201310056 A1 | 3/2013 |
| TW | 201403166 A | 1/2014 |
| WO | WO 2012/086890 A1 | 6/2012 |

OTHER PUBLICATIONS

Chinese Office Action dated Jan. 12, 2017 in corresponding Chinese Patent application No. 201410214964.6 (8 pages in English, 6 pages in Chinese).
Extended European Search Report dated Mar. 2, 2015 for European Patent Application No. 14275113.0.
European Office Action dated Aug. 3, 2018 in corresponding European Patent Application No. 14275113.0 (7 pages in English).
Gross, Herbert, et al., "Handbook of Optical Systems, vol. 3: Aberration Theory and Correction of Optical Systems" *Wiley-VCH*, Jan. 1, 2007 (pp. 377-379).
"Handbook of optical systems, Aberration theory and correction of optical systems, Chapter 31: Correction of Aberration ED—Gross H", Jan. 1, 2007 (Jan. 1, 2007, Handbook of Optical Systems, Aberration Theory and Correction of Optical Systems, Wiley-VCH, Weinheim, DE, pp. 215-221,225,XP002719371, ISBN: 978-3-527-40379-0.
Office Action dated Mar. 18, 2015 for Taiwanese Patent Application No. 103114772 and its English summary provided by Applicant's foreign counsel.
Office Action dated Aug. 3, 2015 in the corresponding Korean Patent Application No. 10-2014-0008211 (6 pages in English, 5 pages in Korean).
Taiwanese Office Action dated Dec. 6, 2016, in counterpart Taiwanese Application No. 104126453 (6 pages in English, 5 pages in Taiwanese).
U.S. Office Action dated Sep. 22, 2016 in counterpart U.S. Appl. No. 14/264,963 (25 pages).
United States Office Action dated Mar. 20, 2017 in corresponding U.S. Appl. No. 14/264,963 (19 pages in English).
United States Office Action dated Sep. 20, 2017 in corresponding U.S. Appl. No. 14/264,963 (12 pages in English).
United States Office Action dated Jan. 16, 2018 in Corresponding U.S. Appl. No. 15/211,493 (19 pages in English).
United States Office Action dated Oct. 2, 2018 in related U.S. Appl. No. 15/211,429 (20 Pages in English).
United States Office Action dated Aug. 21, 2020 in related U.S. Appl. No. 16/281,294 (25 pages in English).
United States Office Action dated Jun. 10, 2021 in related U.S. Appl. No. 16/281,294 (11 pages in English).

* cited by examiner

LENS MODULE

CROSS-REFERENCE TO RELATED APPLICATIONS

This application is a divisional of U.S. patent application Ser. No. 16/281,294 filed on Feb. 21, 2019, now U.S. Pat. No. 11,353,685 issued on Jun. 7, 2022, which is a continuation of U.S. patent application Ser. No. 15/211,493 filed on Jul. 15, 2016, now U.S. Pat. No. 10,241,300 issued on Mar. 26, 2019, which is a divisional of U.S. patent application Ser. No. 14/264,963 filed on Apr. 29, 2014, now U.S. Pat. No. 10,018,805 issued on Jul. 10, 2018, which claims the benefit of Korean Patent Application Nos. 10-2013-0122193 filed on Oct. 14, 2013, and 10-2014-0008211 filed on Jan. 23, 2014, in the Korean Intellectual Property Office, the entire disclosures of which are incorporated herein by reference for all purposes.

BACKGROUND

The present technology generally relates to a lens module.

Recent mobile communications terminals have been provided with camera modules to capture images and to make video calls. In addition, as the functionality of camera modules provided in mobile communications terminals has been gradually increased, cameras for mobile communications terminals have gradually been required to have high degrees of resolution and high levels of performance.

However, since there is a trend for mobile communications terminals to be miniaturized and lightened, there are limitations on implementing camera modules having high degrees of resolution and high levels of performance.

Recently, lenses provided in camera modules have been formed of plastic, a material lighter than glass, and lens modules have been configured using five or more lenses in order to implement high resolution.

However, in the case of lenses formed of plastic, the improvement of chromatic aberrations and the implementation of relatively bright optical systems have been problematic, when compared to than lenses formed of glass.

SUMMARY

Some embodiments of the present disclosure may provide a lens module allowing for improvements in an aberration improvement effect and allowing for the implementation of high degrees of resolution.

According to some embodiments of the present disclosure, a lens module may include: a first lens having positive refractive power; a second lens having refractive power; a third lens having positive refractive power; a fourth lens having refractive power; a fifth lens having refractive power; a sixth lens having refractive power; and a seventh lens having negative refractive power. At least one inflection point may be formed on the image-side surface of the sixth lens. At least one turning point may be formed on an image-side surface of the seventh lens. The first lens, the second lens, the third lens, the fourth lens, the fifth lens, the sixth lens and the seventh lens are disposed in a sequential order from the first lens to the seventh lens.

According to some embodiments of the present disclosure, a lens module may include: a first lens having positive refractive power; a second lens having positive refractive power; a third lens having positive refractive power; a fourth lens having refractive power; a fifth lens having refractive power; a sixth lens having refractive power; and a seventh lens having negative refractive power. At least one inflection point may be formed on the image-side surface of the sixth lens. At least one turning point may be formed on an image-side surface of the seventh lens.

According to some embodiments of the present disclosure, a lens module may include: a first lens having positive refractive power; a second lens having refractive power; a third lens having negative refractive power; a fourth lens having positive refractive power; a fifth lens having positive refractive power; a sixth lens having refractive power; and a seventh lens having negative refractive power. At least one inflection point may be formed on the image-side surface of the sixth lens. At least one turning point may be formed on an image-side surface of the seventh lens.

Some embodiments of the lens module may satisfy Conditional Expression 1:

$$1.0 < f12/f < 2.0 \quad \text{[Conditional Expression 1]}$$

where f12 is a synthetic focal length [mm] of the first and second lens, and f is an overall focal length [mm] of the optical system.

Some embodiments of the lens module may satisfy Conditional Expression 2:

$$TTL/f < 1.40 \quad \text{[Conditional Expression 2]}$$

where TTL is a distance [mm] from an object-side surface of the first lens to an image surface, and f is an overall focal length [mm] of the optical system.

Some embodiments of the lens module may satisfy Conditional Expression 3:

$$BFL/f > 0.2 \quad \text{[Conditional Expression 3]}$$

where BFL is a distance [mm] from the image-side surface of the seventh lens to an image surface, and f is an overall focal length [mm] of the optical system.

Some embodiments of the lens module may satisfy Conditional Expression 4:

$$R1/f > 0.35 \quad \text{[Conditional Expression 4]}$$

where R1 is a radius of curvature [mm] of an object-side surface of the first lens, and f is an overall focal length [mm] of the optical system.

Some embodiments of the lens module may satisfy Conditional Expression 5:

$$-0.6 < (R11 - R12)/(R11 + R12) < 8.0$$

where R11 is a radius of curvature [mm] of an object-side surface of the sixth lens, and R12 is a radius of curvature [mm] of an image-side surface of the sixth lens.

Some embodiments of the lens module may satisfy Conditional Expression 6:

$$-2.0 < R13/f < 1.0 \quad \text{[Conditional Expression 6]}$$

where R13 is a radius of curvature [mm] of an object-side surface of the seventh lens.

Some embodiments of the lens module may satisfy Conditional Expression 7:

$$-10.0 < (R5 - R6)/(R5 + R6) < 14.0 \quad \text{[Conditional Expression 7]}$$

where R5 is a radius of curvature [mm] of an object-side surface of the third lens, and R6 is a radius of curvature [mm] of an image-side surface of the third lens.

Some embodiments of the lens module may satisfy Conditional Expression 8:

$$ANG/f > 15.0 \quad \text{[Conditional Expression 8]}$$

where ANG is an angle of view of the lens module, and f is an overall focal length [mm] of an optical system including the first to seventh lenses.

The some embodiments of the lens module may satisfy Conditional Expression 9:

$$|f1|<|f3| \qquad \text{[Conditional Expression 9]}$$

where f1 is a focal length [mm] of the first lens, and f3 is a focal length [mm] of the third lens.

BRIEF DESCRIPTION OF DRAWINGS

Exemplary embodiments of the present disclosure will be more clearly understood from the following detailed description taken in conjunction with the accompanying drawings, in which.

DETAILED DESCRIPTION

Figure 1:
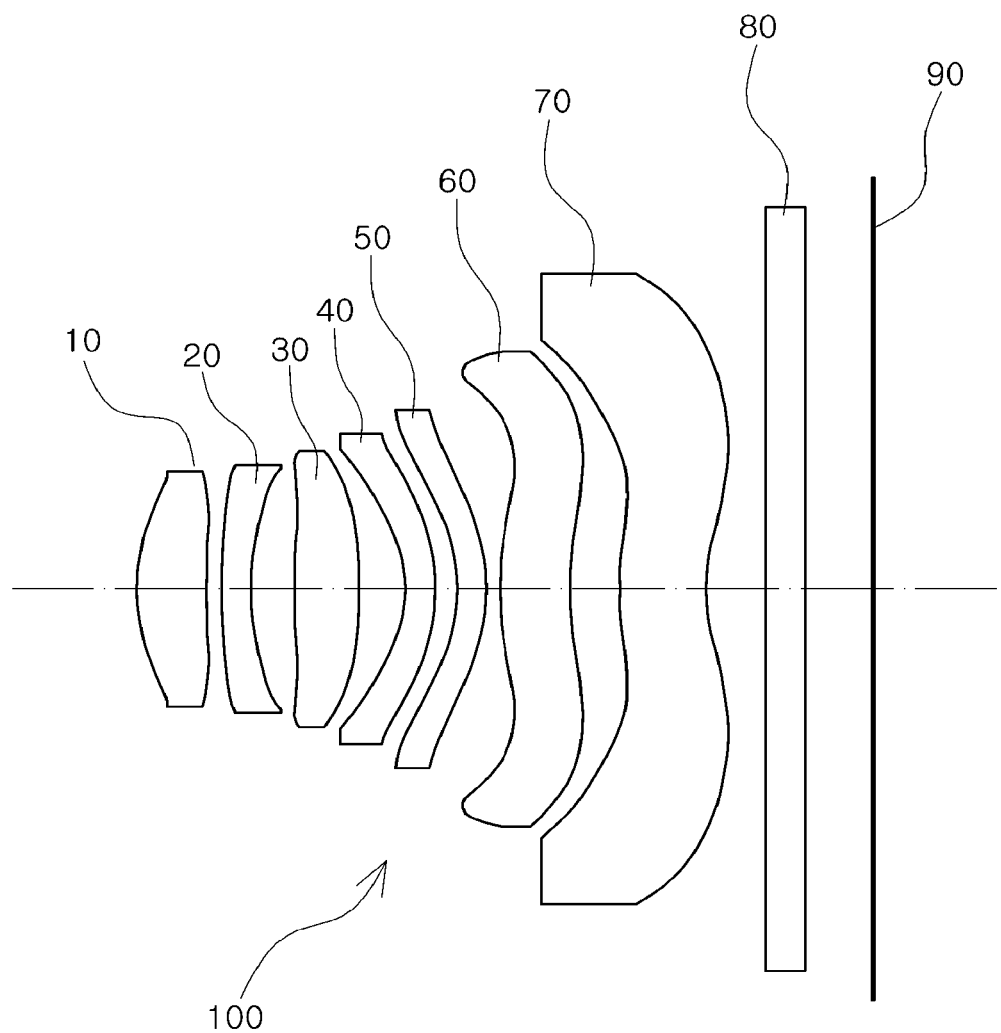
FIG. 1 is a configuration diagram of a lens module according to a first exemplary embodiment of the present disclosure.

Exemplary embodiments of the present disclosure will be described in detail with reference to the accompanying drawings. The invention may, however, be embodied in many different forms and should not be construed as being limited to the embodiments set forth herein. Rather, these embodiments are provided to explain the principles of the invention and its practical applications, thereby enabling others skilled in the art to understand the invention for various embodiments and with various modifications as are suited to the particular use contemplated. In the drawings, the shapes and dimensions of elements may be exaggerated for clarity, and the same reference numerals will be used throughout to designate the same or like elements. It will also be understood that, although the terms first, second, etc. may be used herein to describe various elements, these elements should not be limited by these terms. These terms are only used to distinguish one element from another. As used in this description and the appended claims, the singular forms "a", "an" and "the" are intended to include the plural forms as well, unless the context clearly indicates otherwise.

In the present exemplary embodiments, a first lens refers to a lens that is the closest to an object side and a seventh lens refers to a lens that is the closest to an image side. Further, the term 'front' refers to a direction from the lens module toward an object side, while the term 'rear' refers to a direction from the lens module toward an image sensor or the image side. In addition, a first surface of each lens refers to a surface close to the object side (or an object-side surface) and a second surface of each lens refers to a surface close to the image side (or an image-side surface). Further, unless particularly described, in the present exemplary embodiments, units of all of radii of curvature, thicknesses, TTLs, BFLs, and focal lengths (e.g., f, f1, f2, f3, f4, f5, f6, f7, and f12) of the lenses may be mm. In addition, the thickness of the lens, intervals between the lenses, the TTL (or OAL), SL, and BFL are distance measured on an optical axis of the lens. Further, in a description for a shape of the lens, the meaning that one surface of the lens is convex is that an optical axis portion of a corresponding surface is convex, and the meaning that one surface of the lens is concave is that an optical axis portion of a corresponding portion is concave. Therefore, although it is described that one surface of the lens is convex, an periphery portion of the lens may be concave. Likewise, although it is described that one surface of the lens is concave, an periphery portion of the lens may be convex. In addition, in the following detailed description, the term "inflection point" refers to a point at which a radius of curvature is changed in a portion that does not cross the optical axis. Further, in the following detailed description, the term "turning point" refers to a convex or concave point in a portion that does not cross the optical axis.

Figure 2:
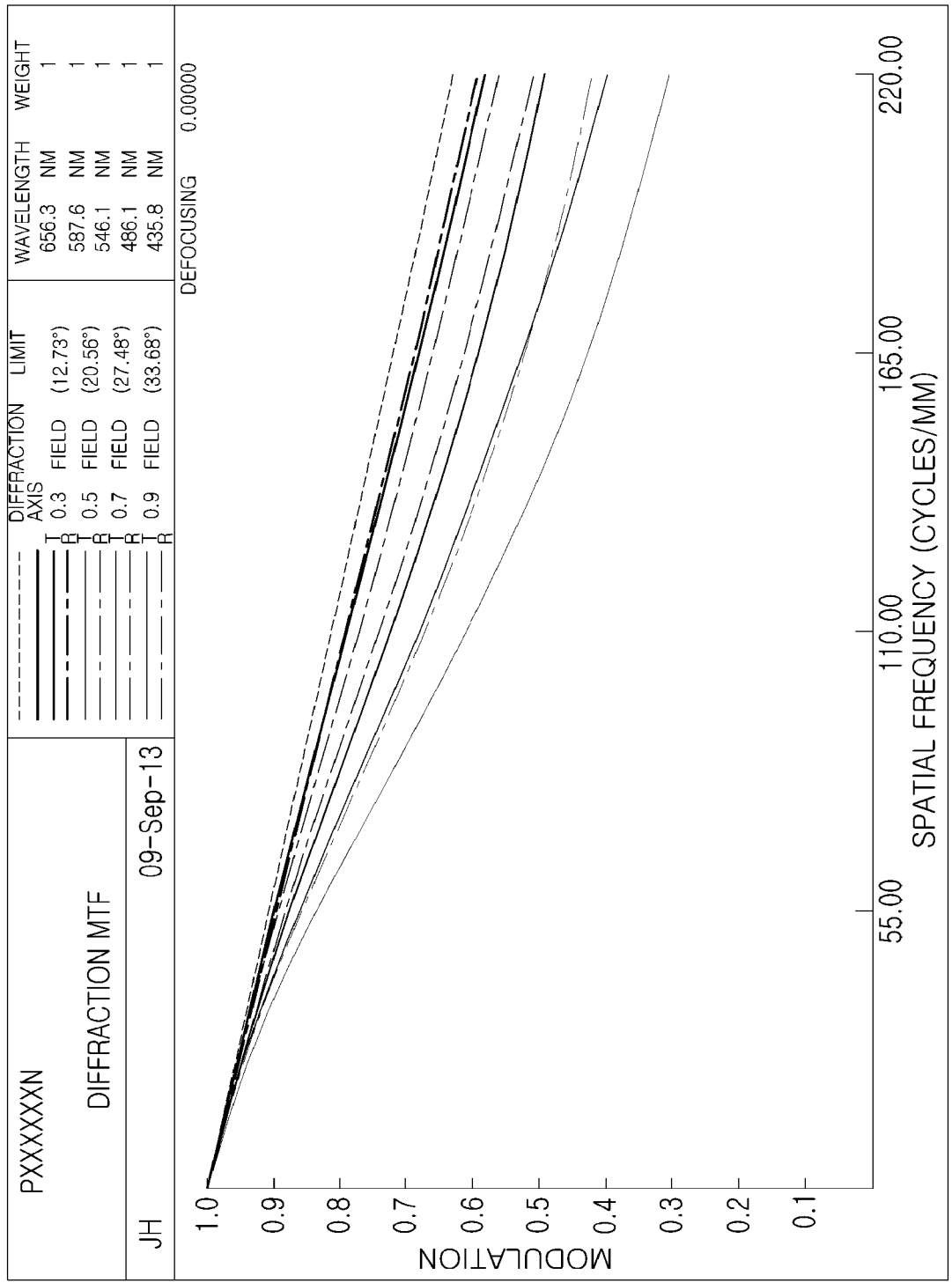
FIG. 2 is a graph showing a modulation transfer function (MTF) of the lens module shown in FIG. 1.
Figure 3:
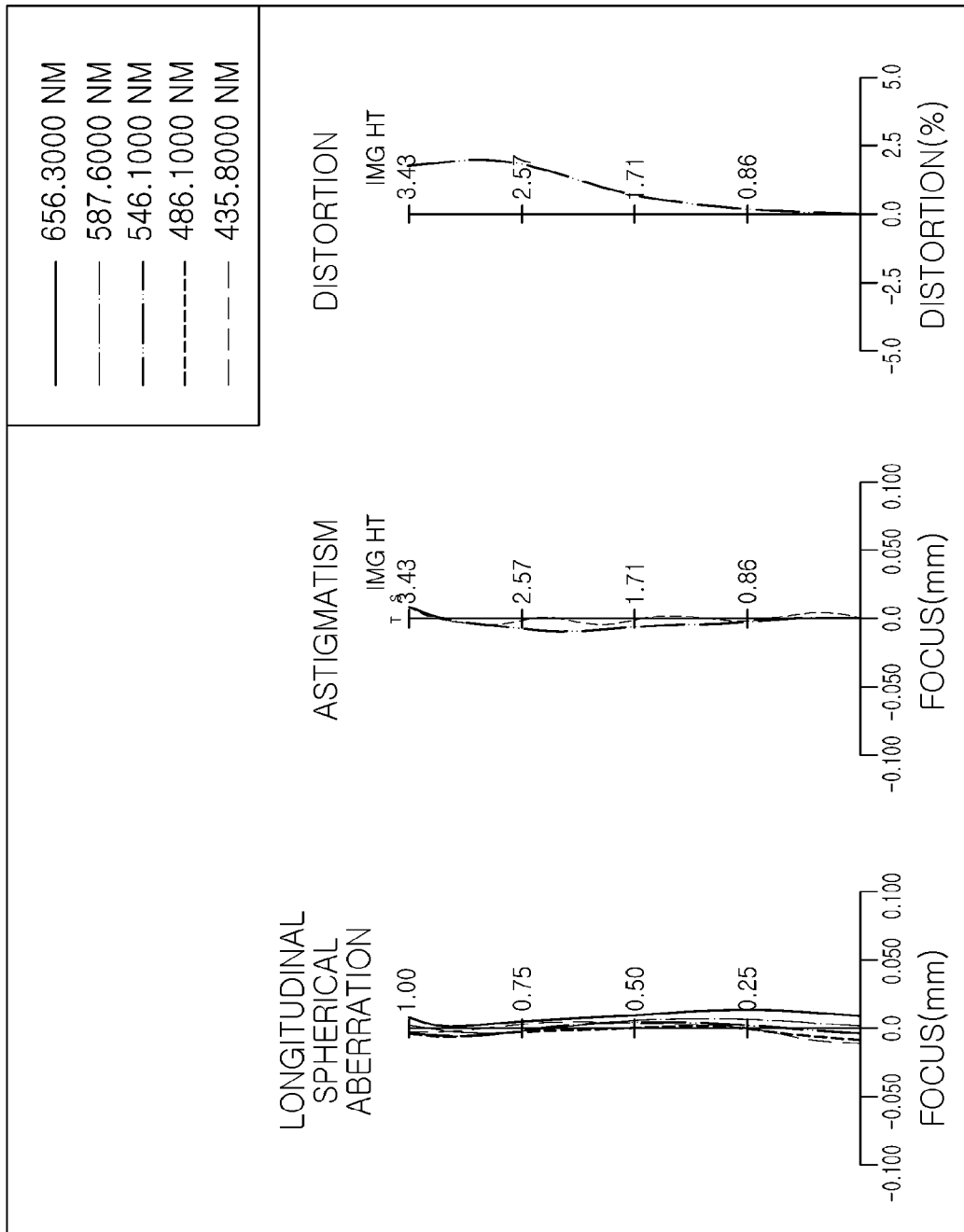
FIG. 3 is graphs showing aberration characteristics of the lens module shown in FIG. 1.
Figure 4:
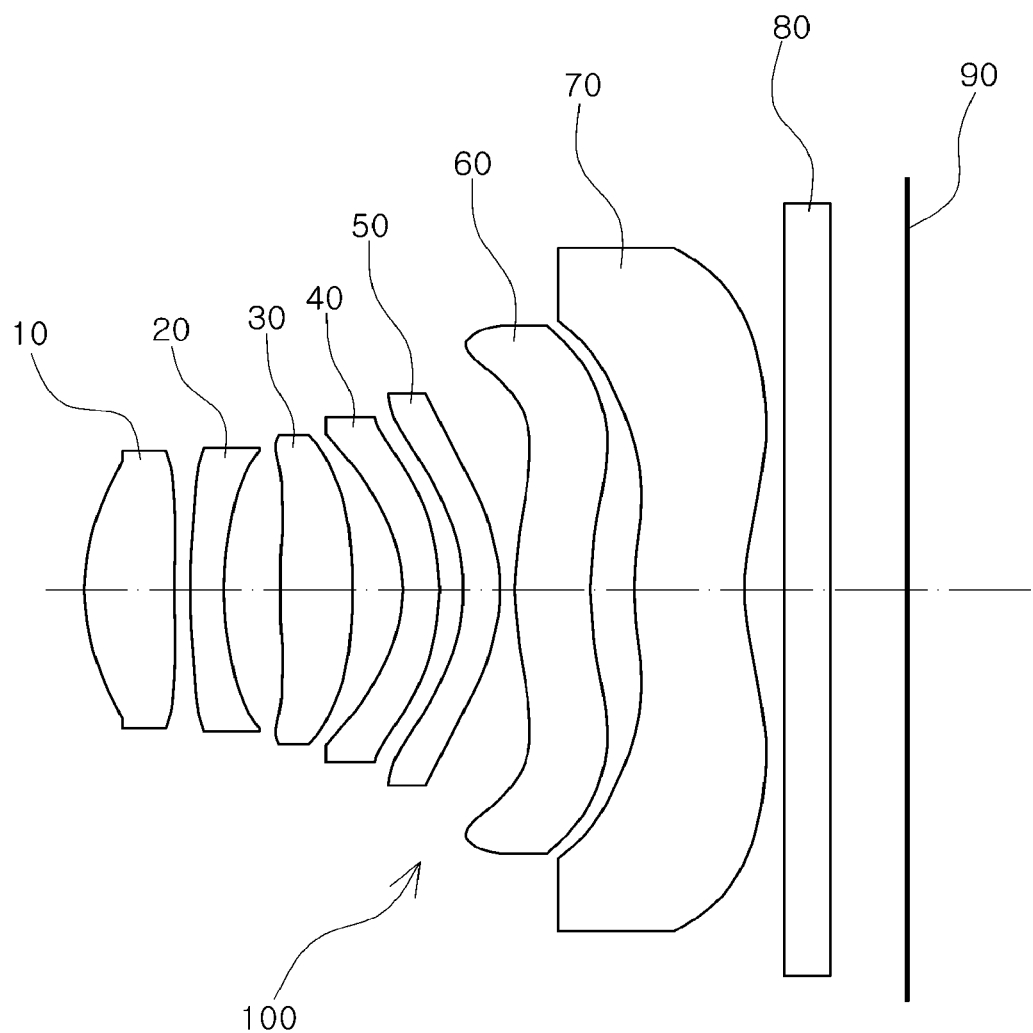
FIG. 4 is a configuration diagram of a lens module according to a second exemplary embodiment of the present disclosure.
Figure 5:
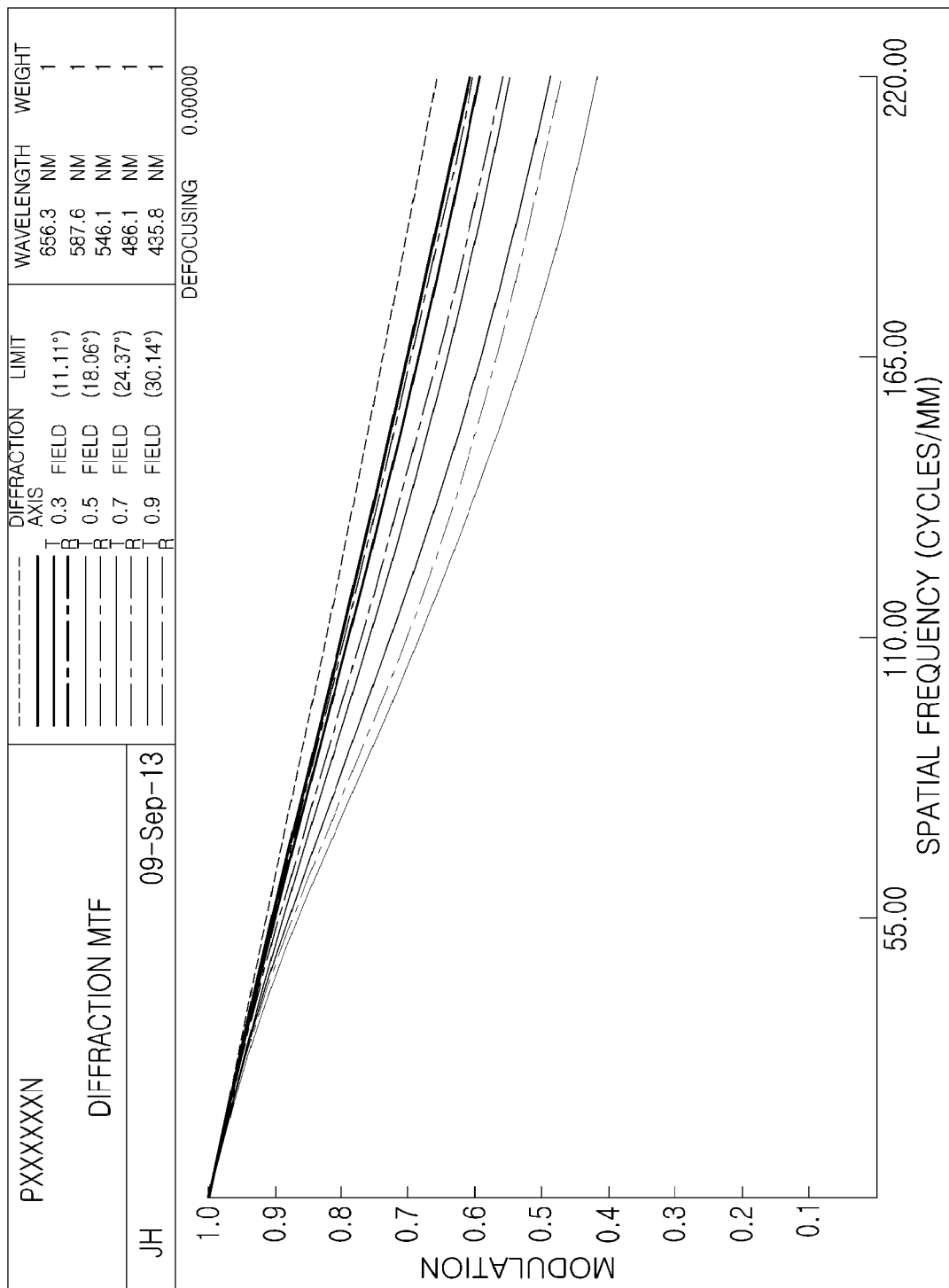
FIG. 5 is a graph showing a MTF of the lens module shown in FIG. 4.
Figure 6:
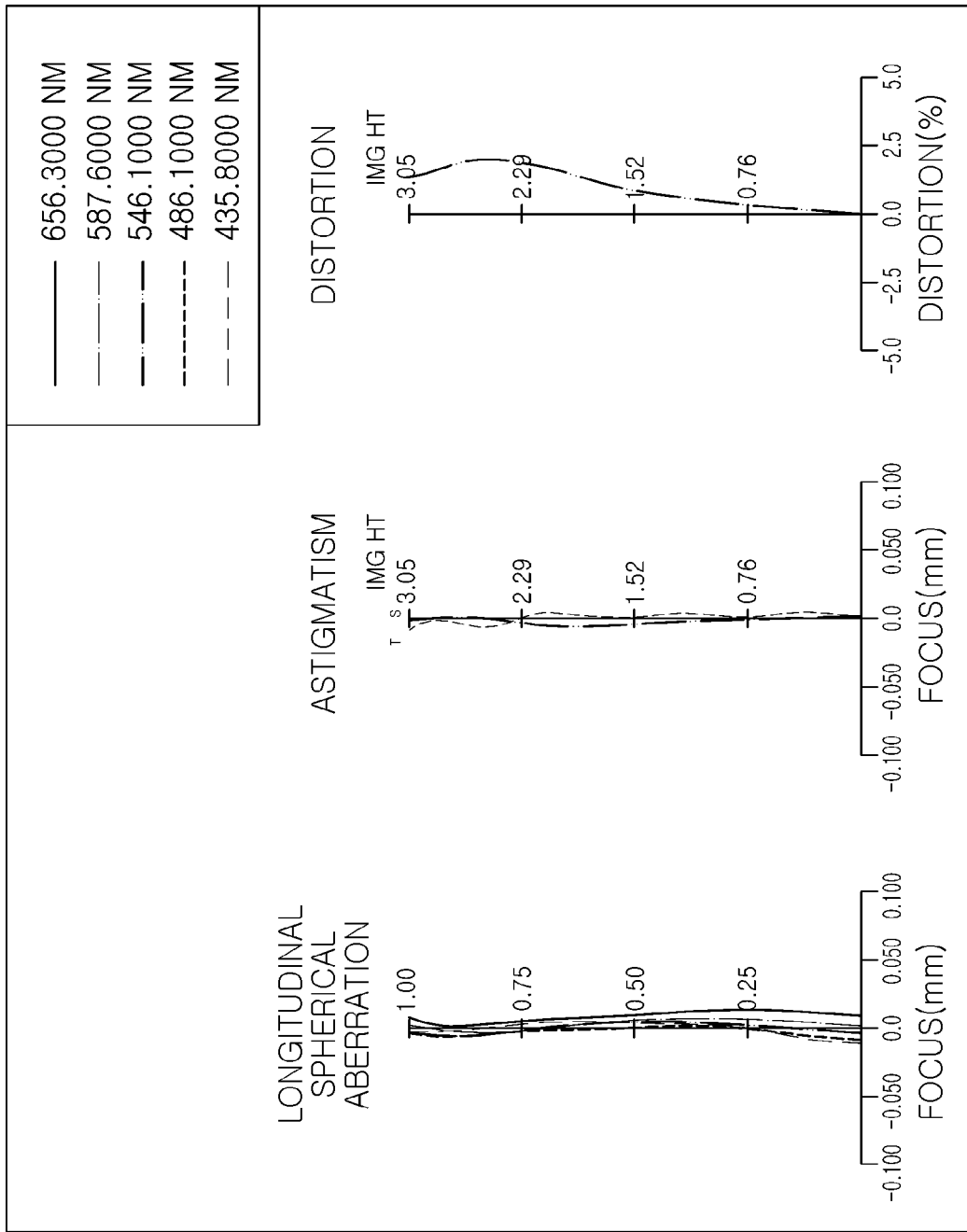
FIG. 6 is graphs showing aberration characteristics of the lens module shown in FIG. 4.
Figure 7:
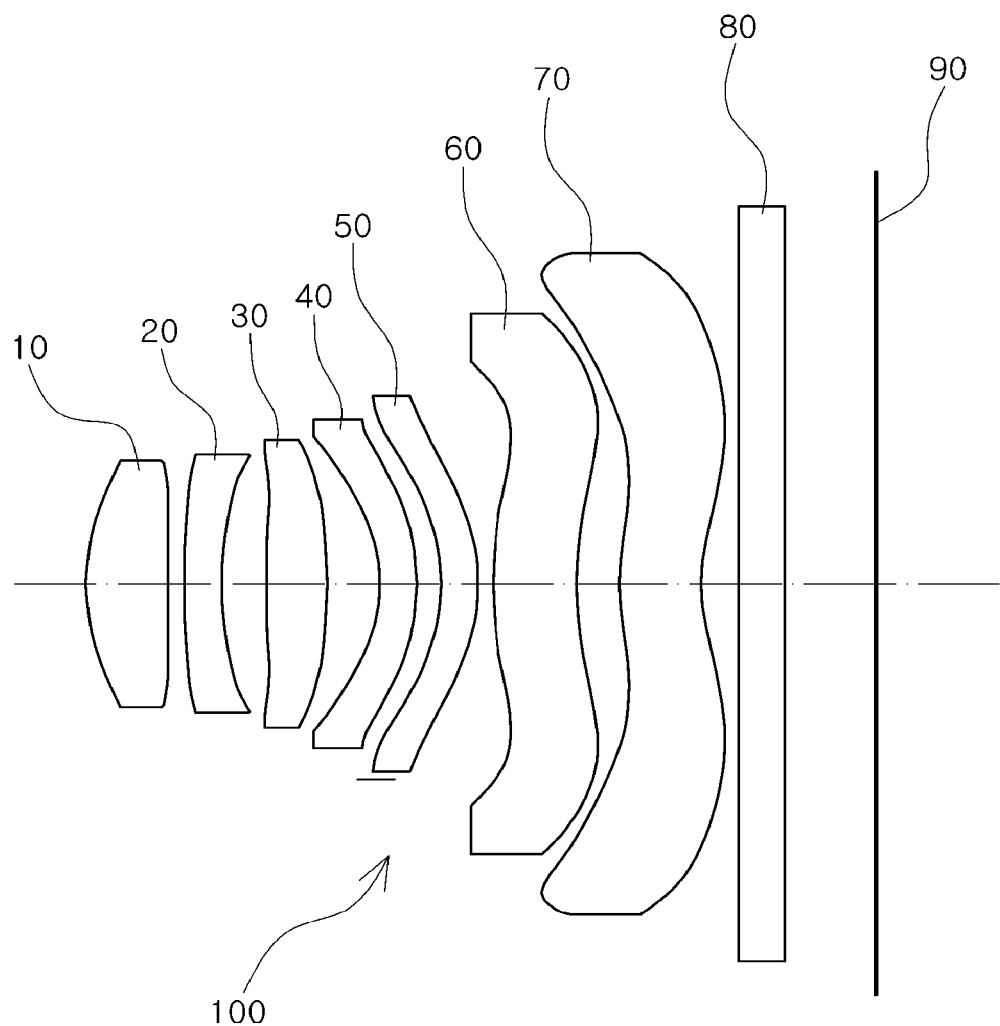
FIG. 7 is a configuration diagram of a lens module according to a third exemplary embodiment of the present disclosure.
Figure 8:
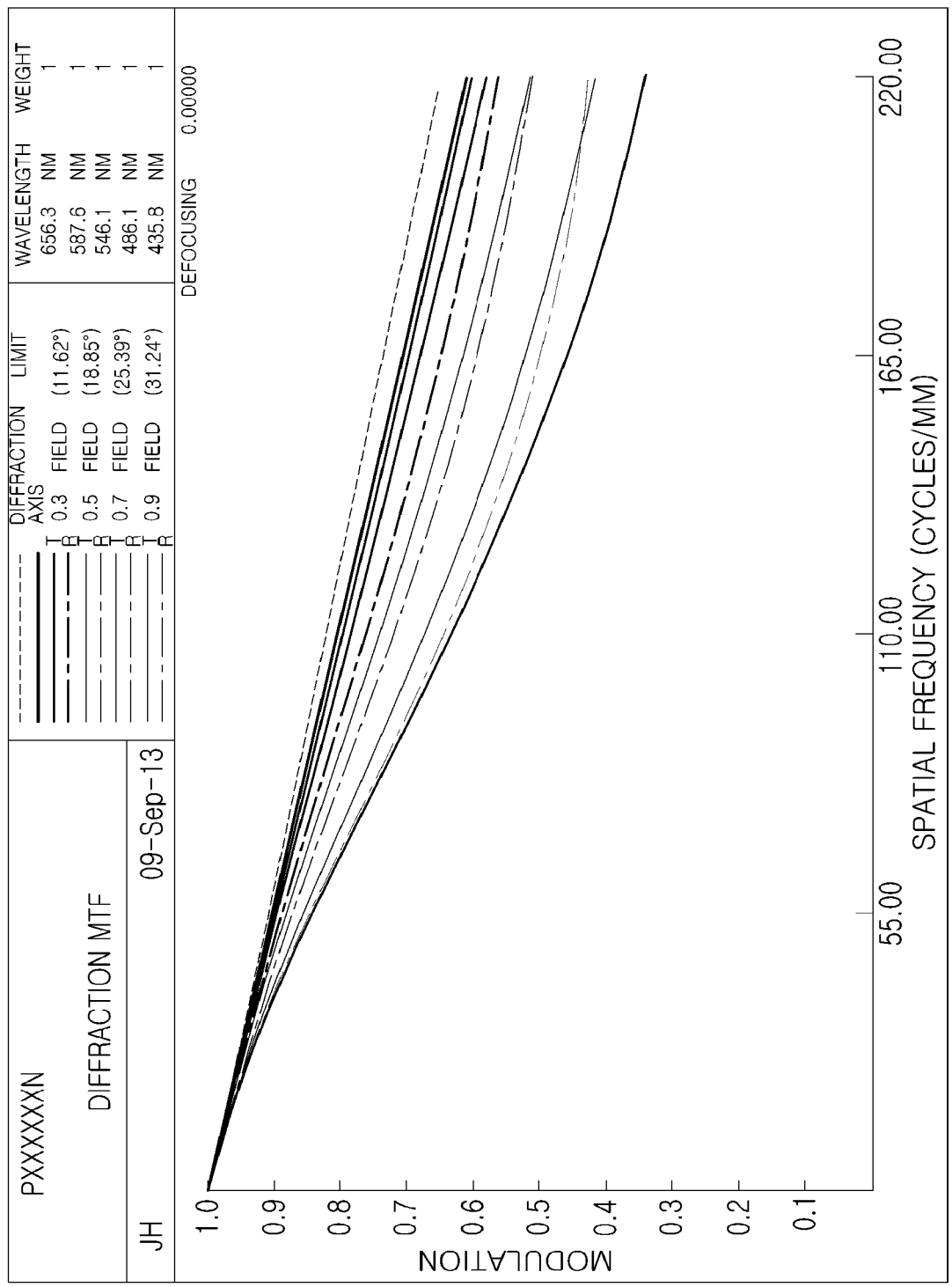
FIG. 8 is a graph showing a MTF of the lens module shown in FIG. 7.
Figure 9:
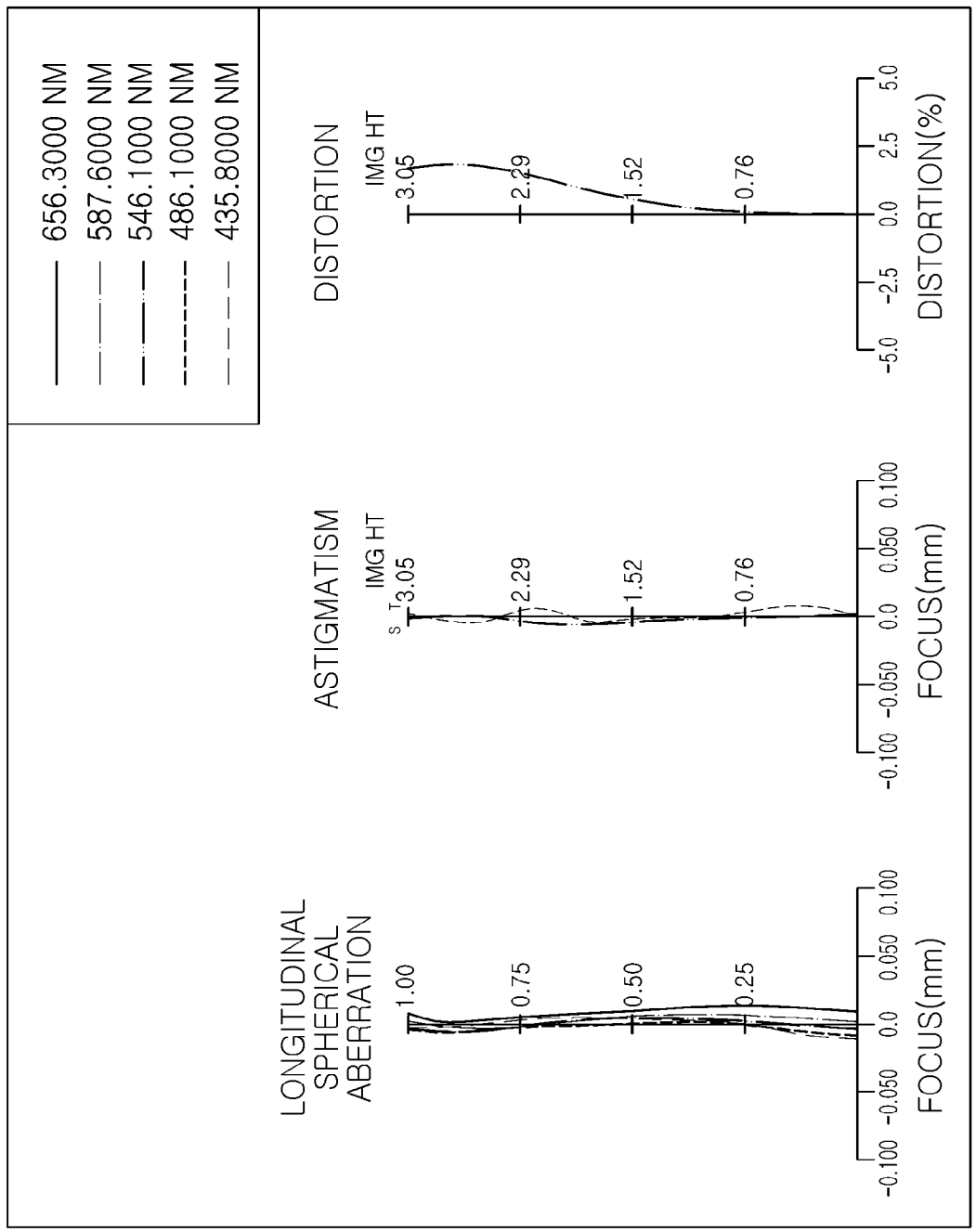
FIG. 9 is graphs showing aberration characteristics of the lens module shown in FIG. 7.
Figure 10:
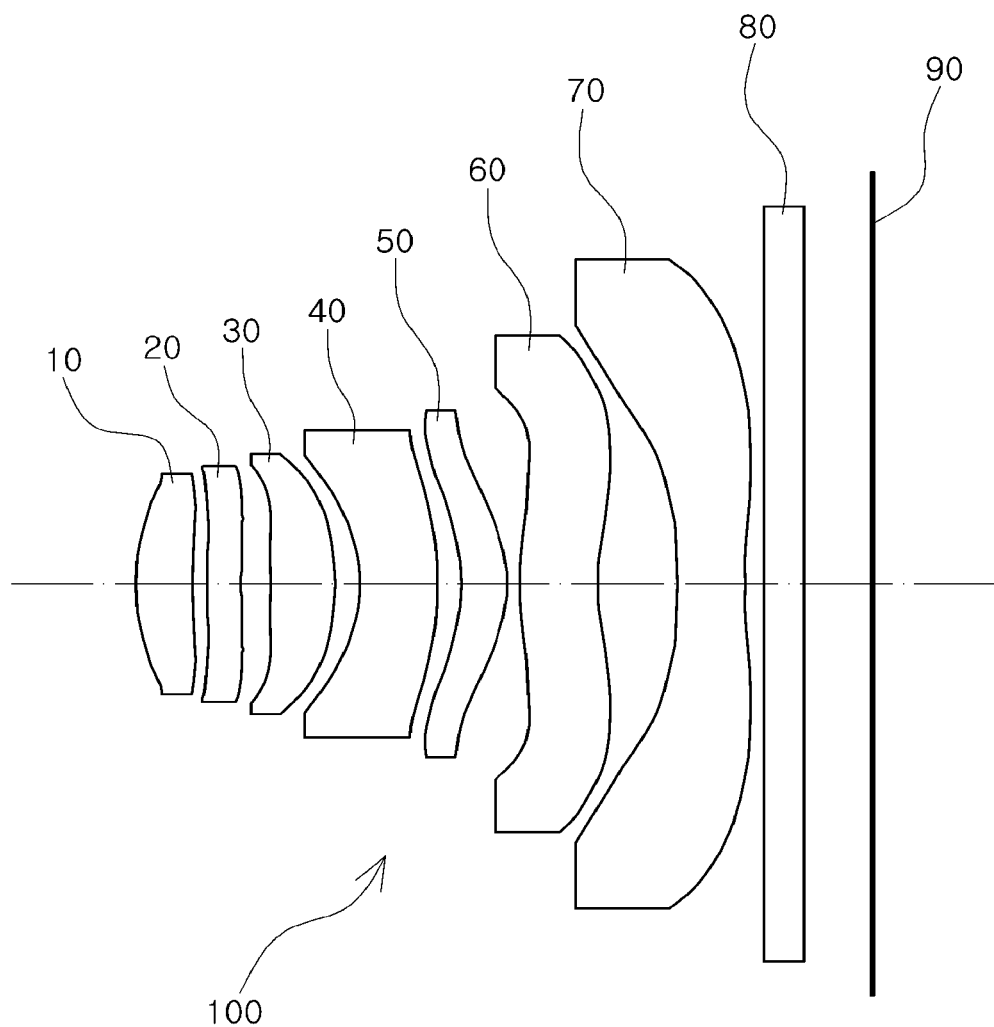
FIG. 10 is a configuration diagram of a lens module according to a fourth exemplary embodiment of the present disclosure.
Figure 11:
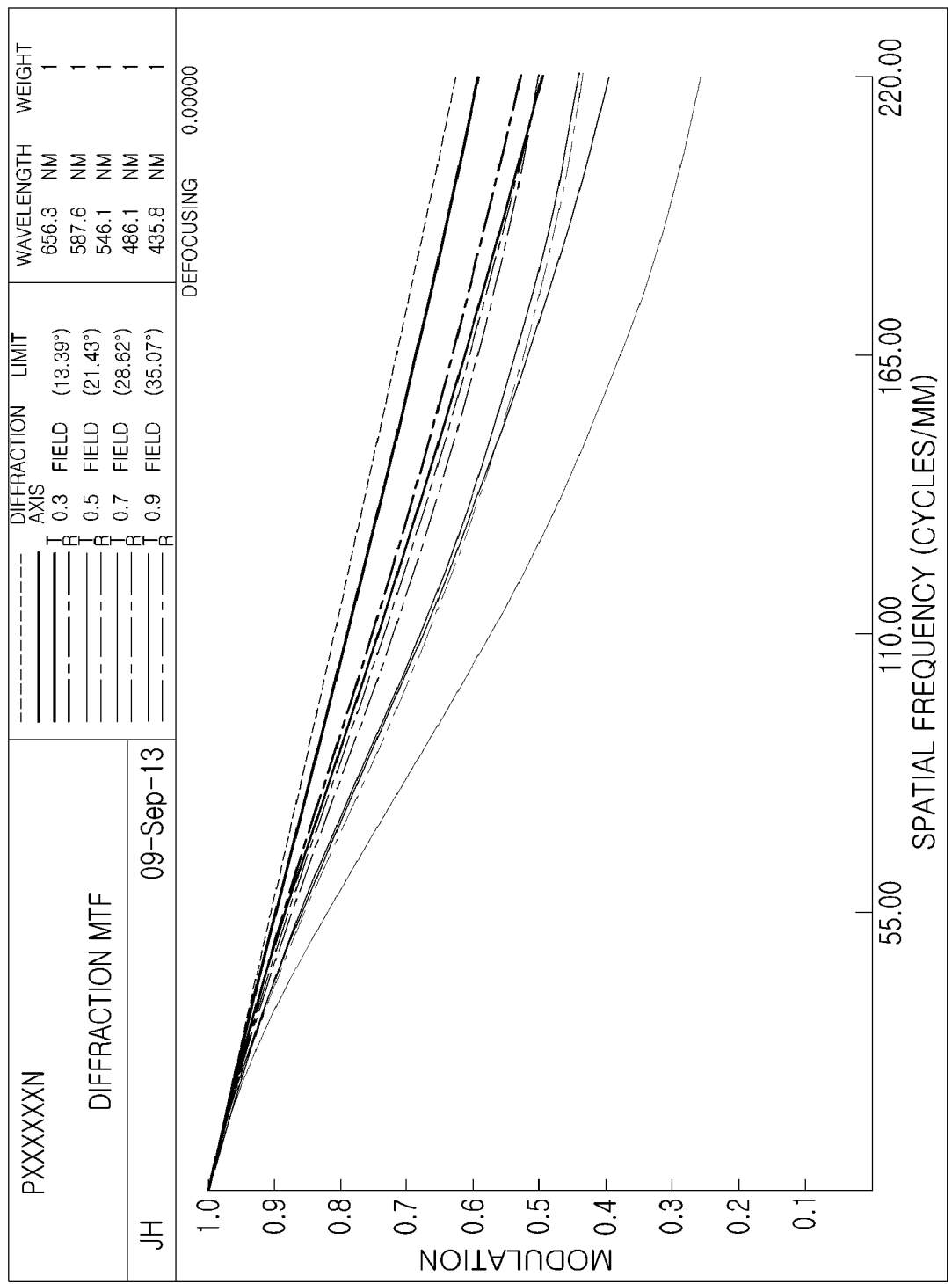
FIG. 11 is a graph showing a MTF of the lens module shown in FIG. 10.
Figure 12:
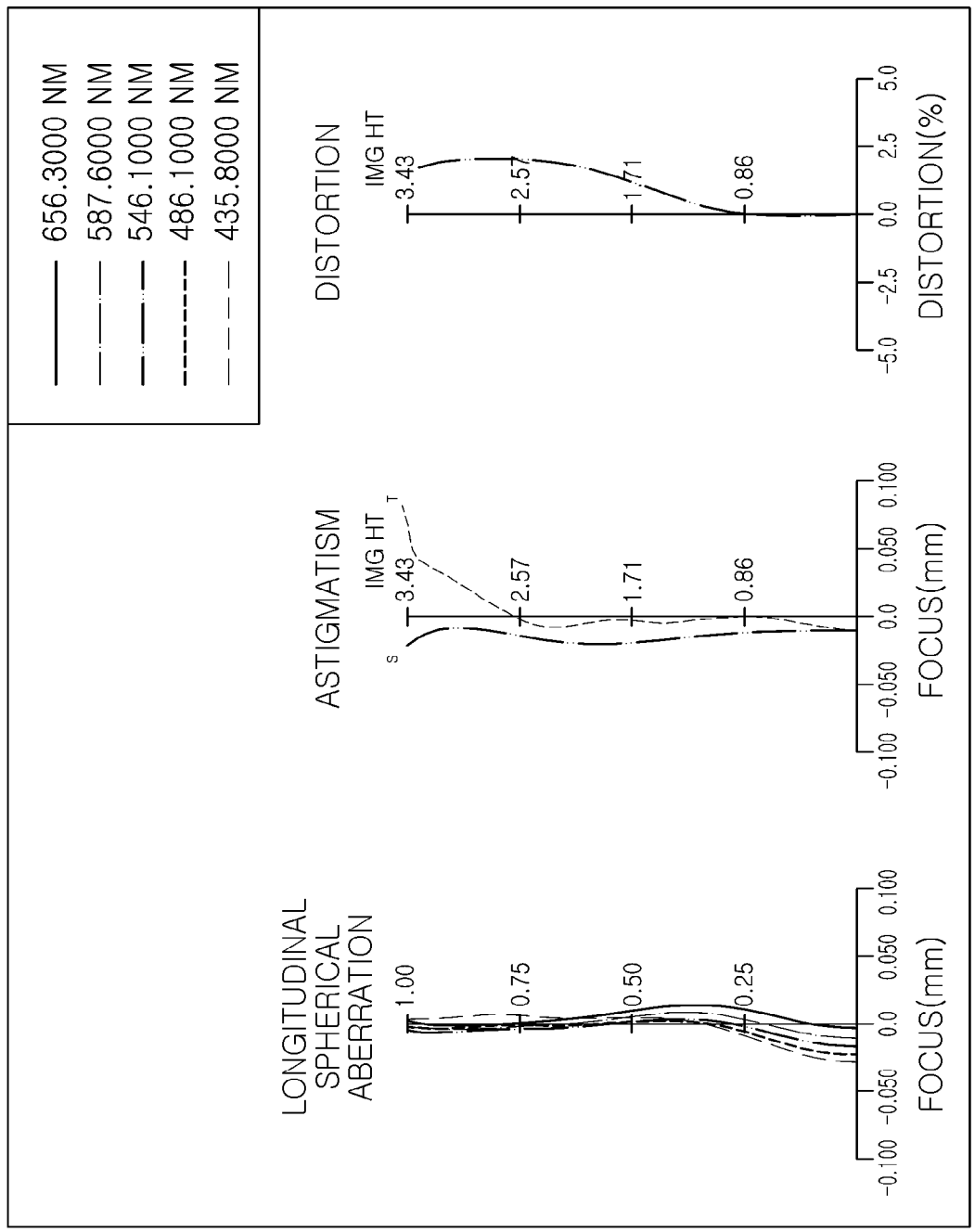
FIG. 12 is graphs showing aberration characteristics of the lens module shown in FIG. 10.
Figure 13:
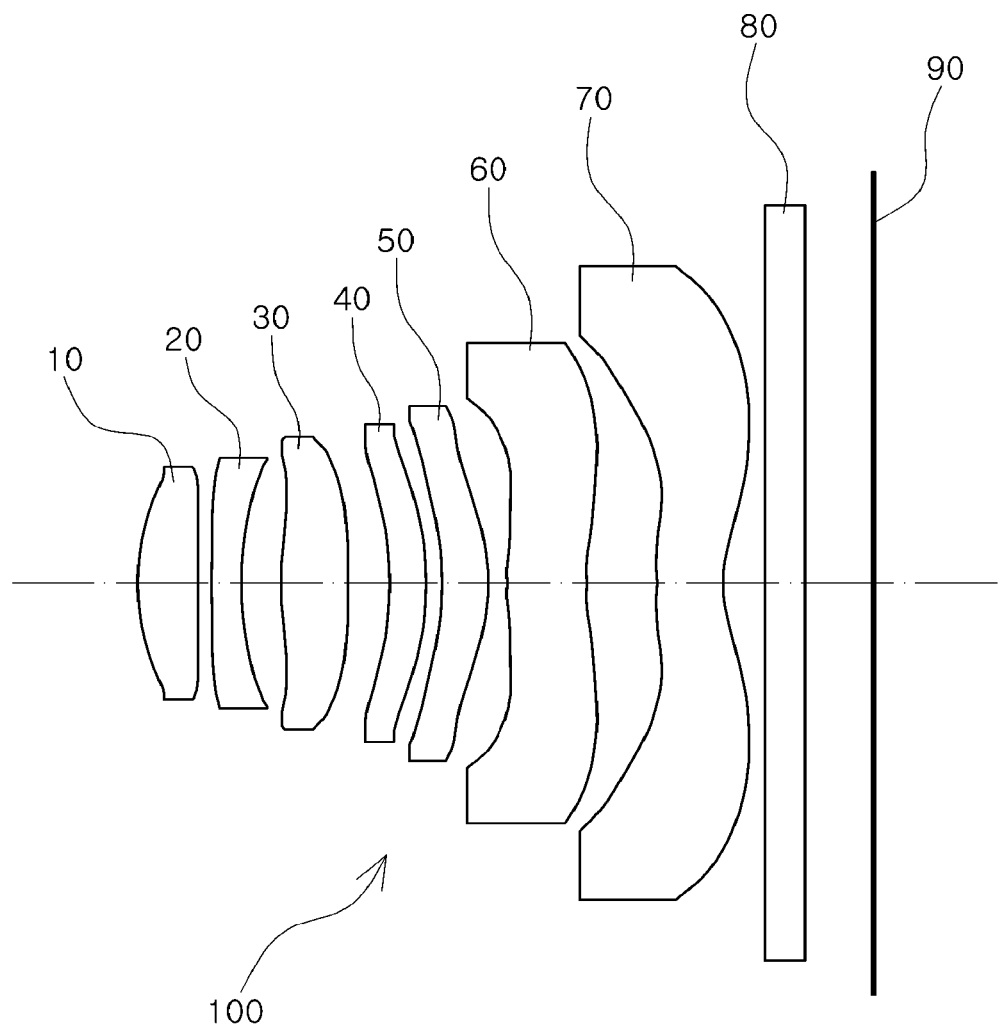
FIG. 13 is a configuration diagram of a lens module according to a fifth exemplary embodiment of the present disclosure.
Figure 14:
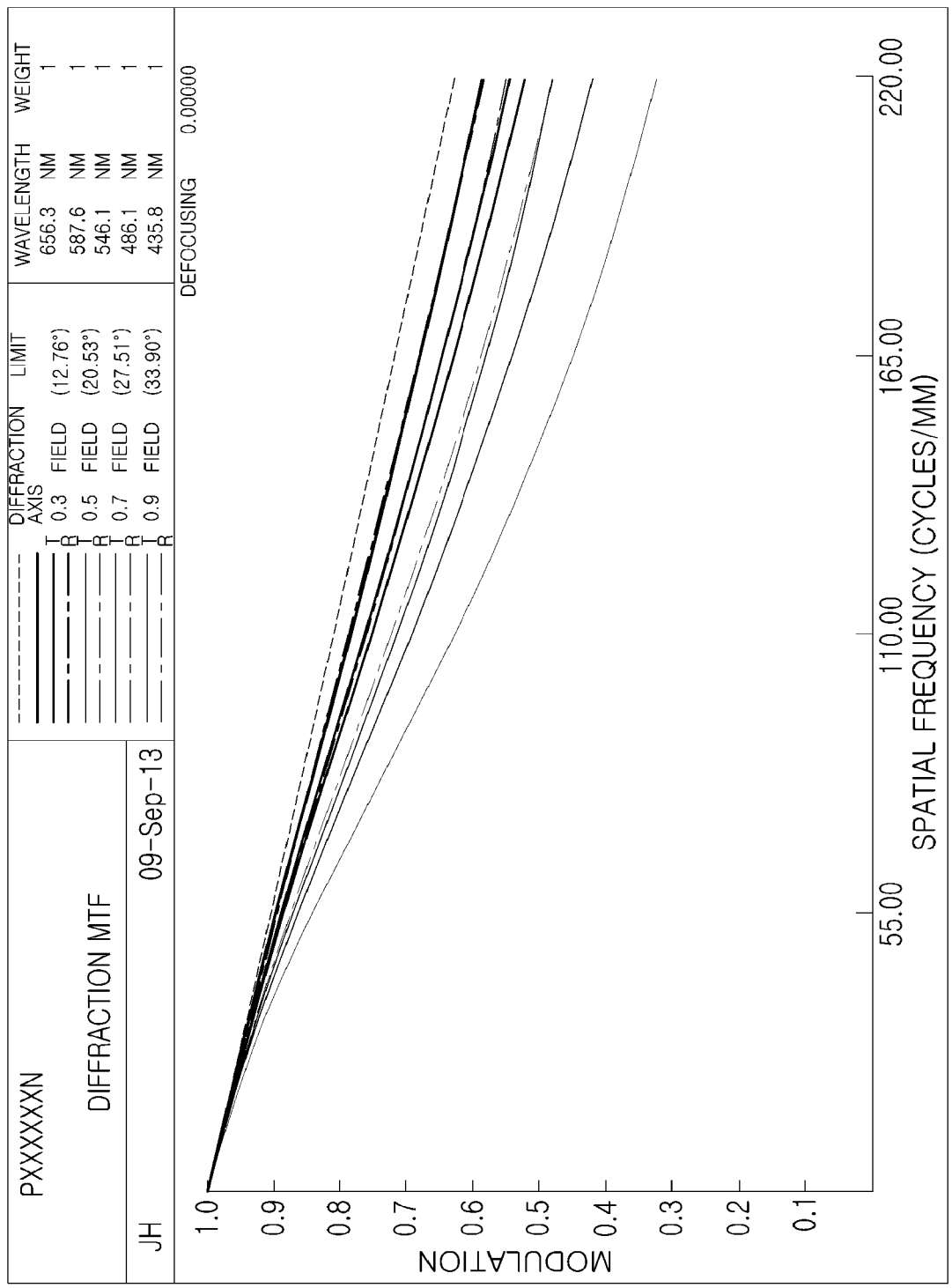
FIG. 14 is a graph showing a MTF of the lens module shown in FIG. 13.
Figure 15:
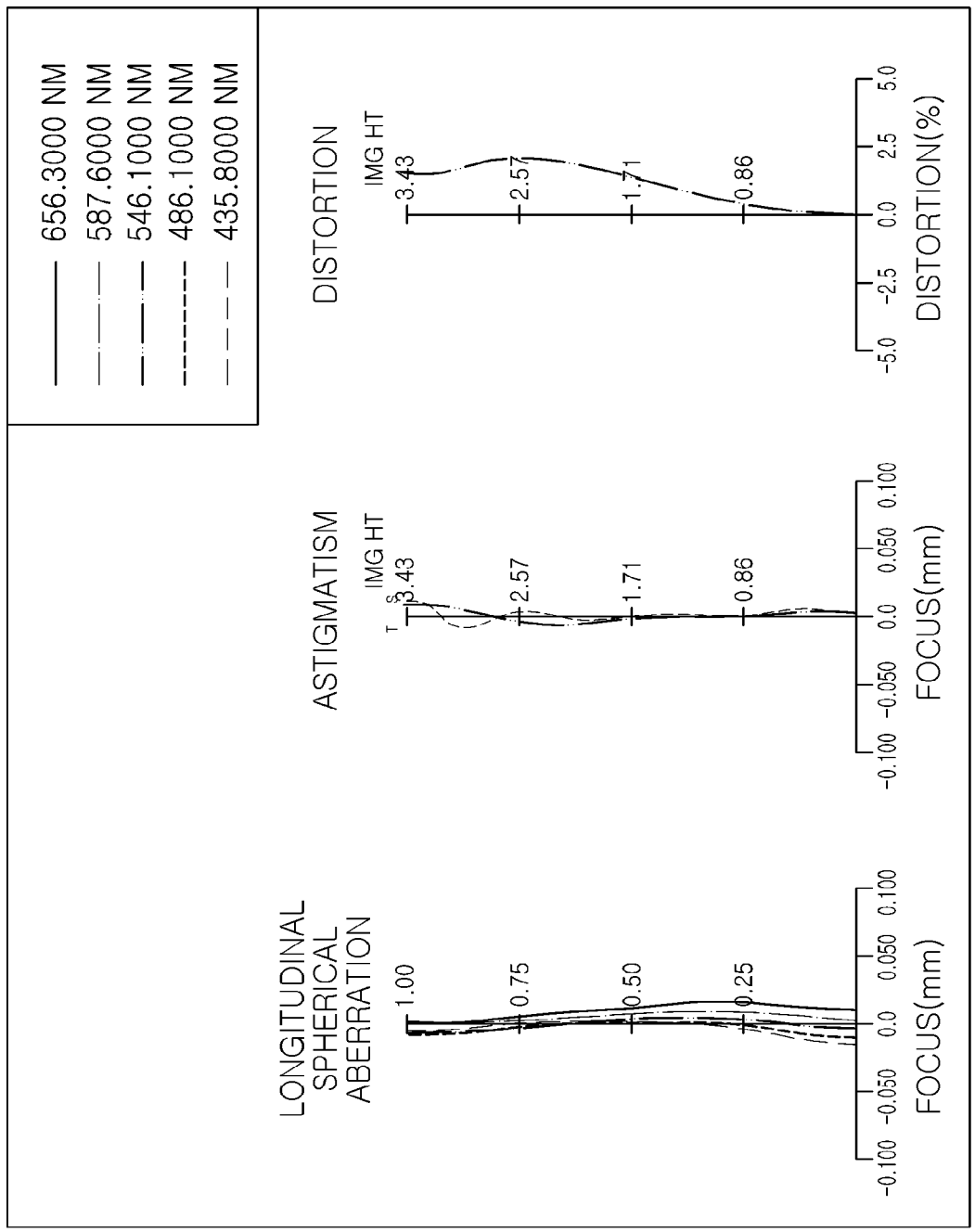
FIG. 15 is graphs showing aberration characteristics of the lens module shown in FIG. 13.
Figure 16:
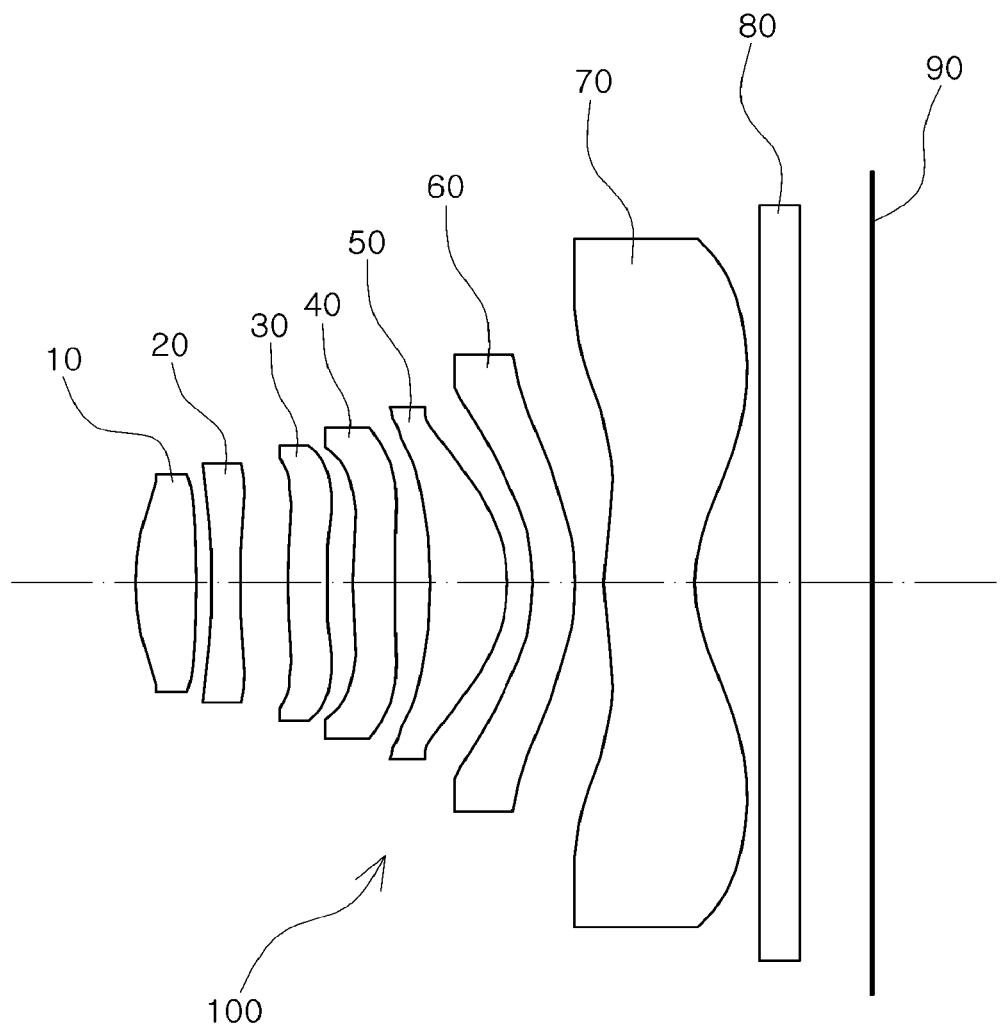
FIG. 16 is a configuration diagram of a lens module according to a sixth exemplary embodiment of the present disclosure.
Figure 17:
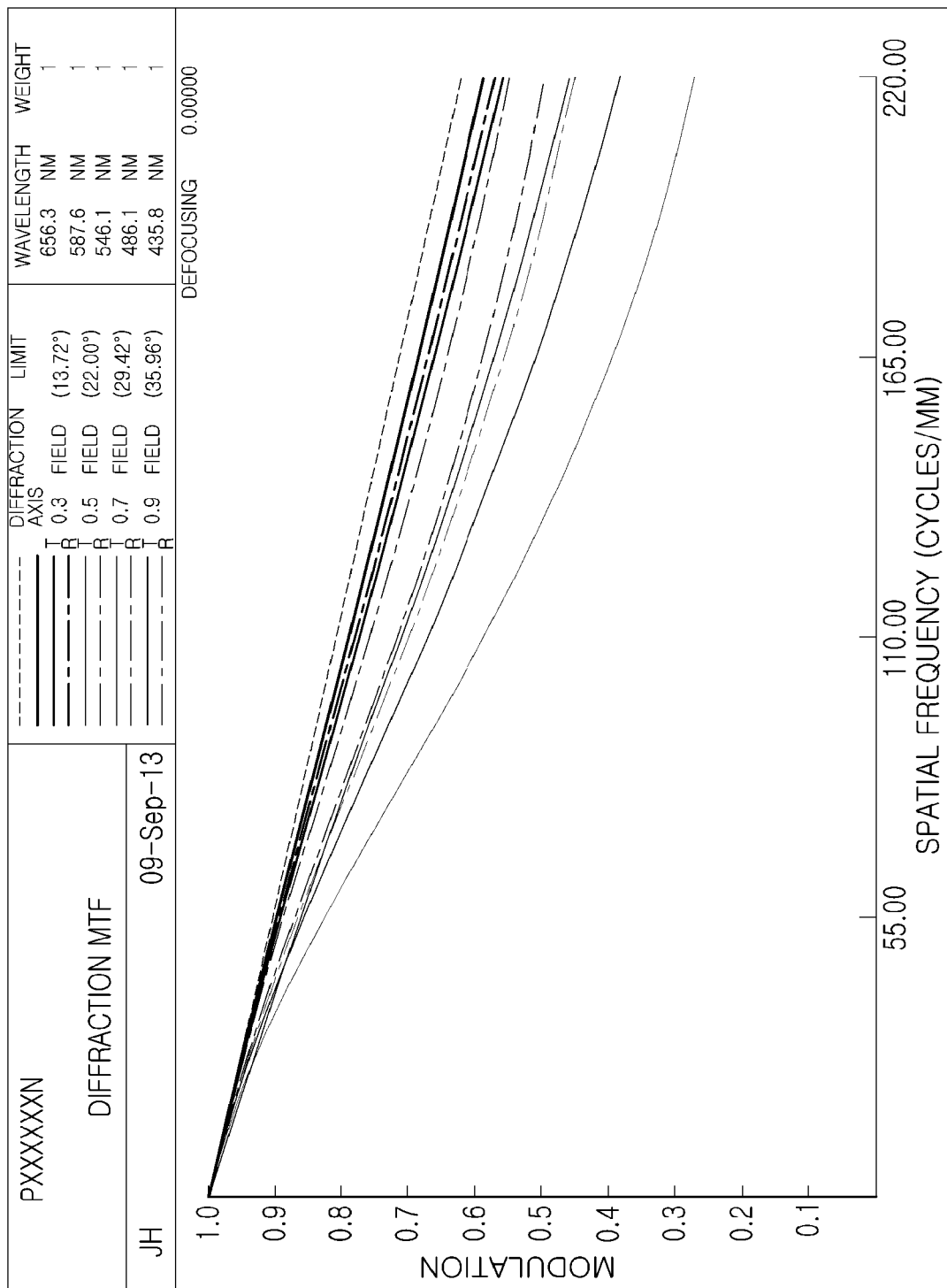
FIG. 17 is a graph showing a MTF of the lens module shown in FIG. 16.
Figure 18:
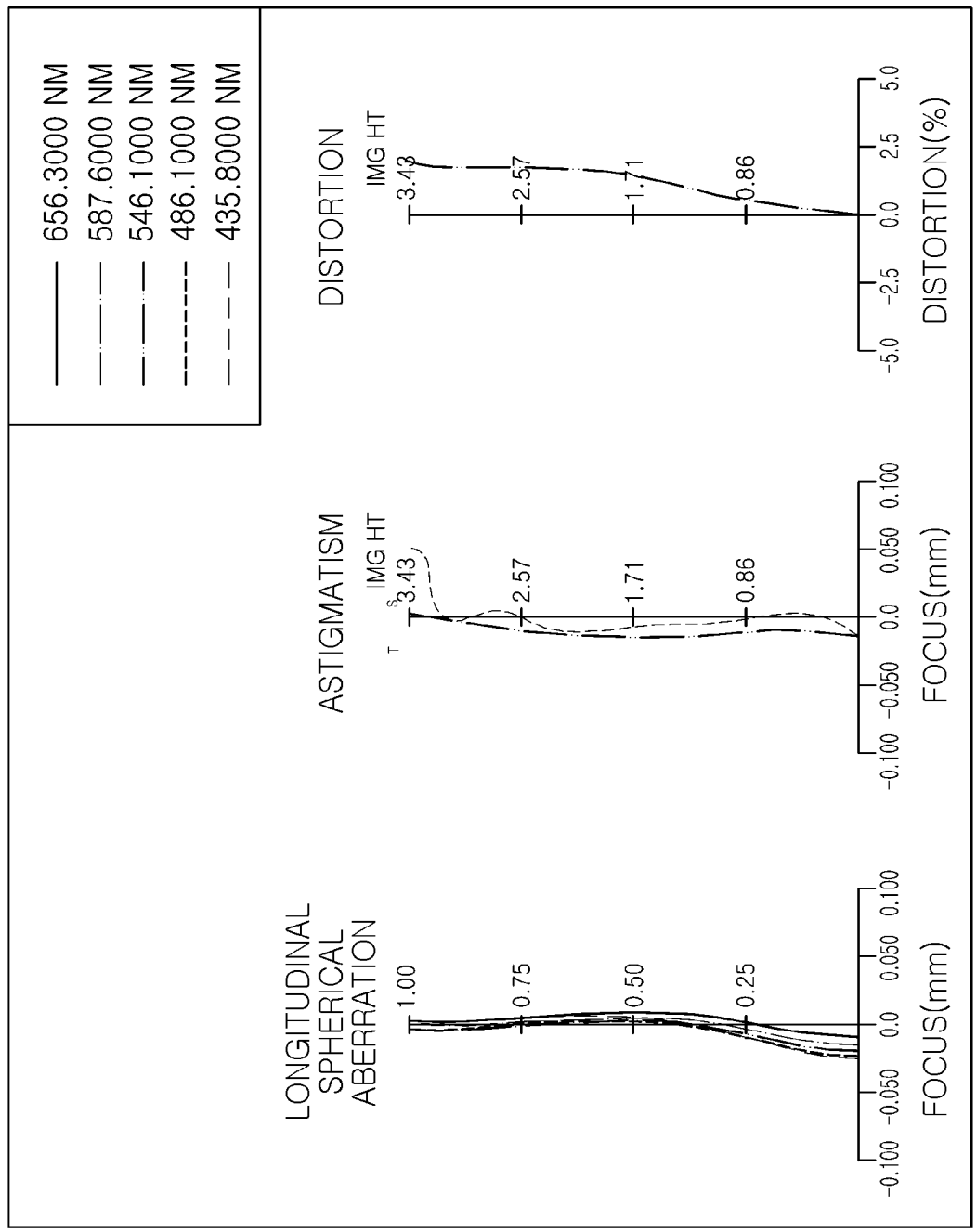
FIG. 18 is graphs showing aberration characteristics of the lens module shown in FIG. 16.
Figure 19:
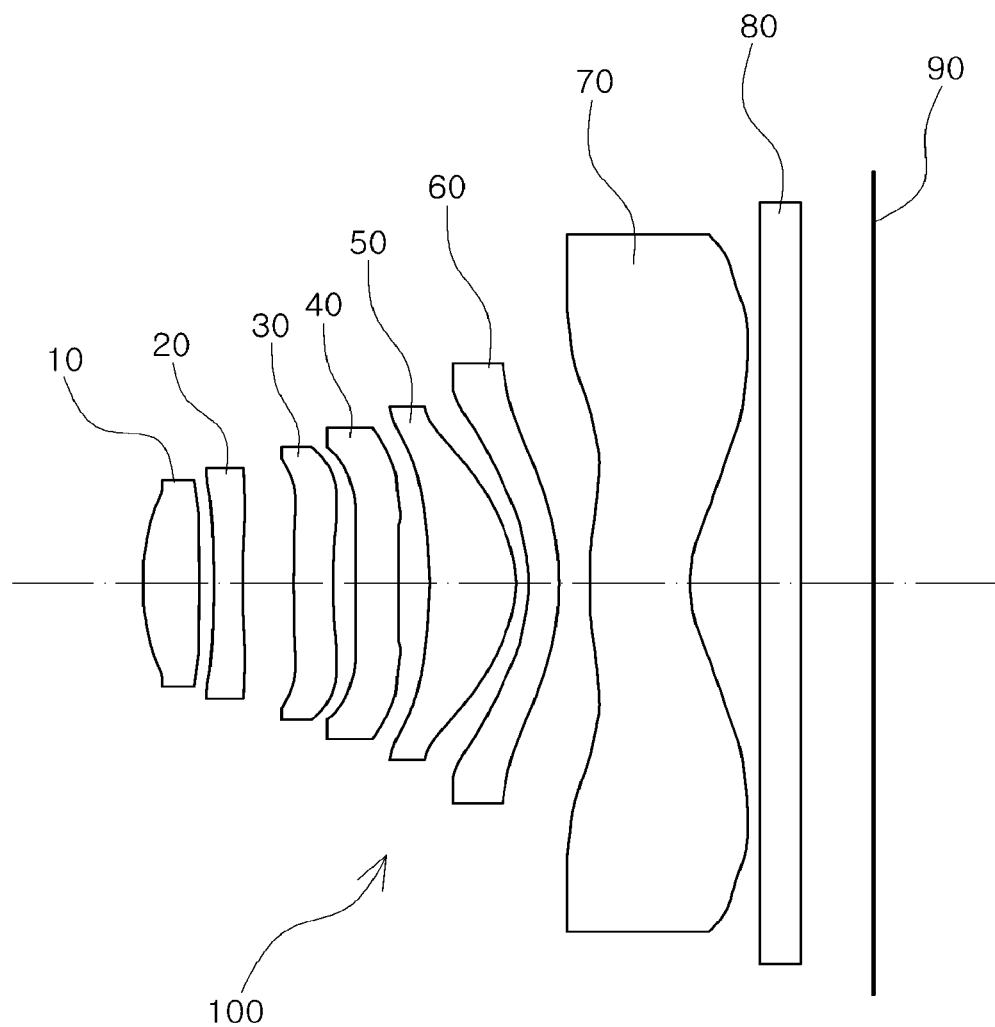
FIG. 19 is a configuration diagram of a lens module according to a seventh exemplary embodiment of the present disclosure.
Figure 20:
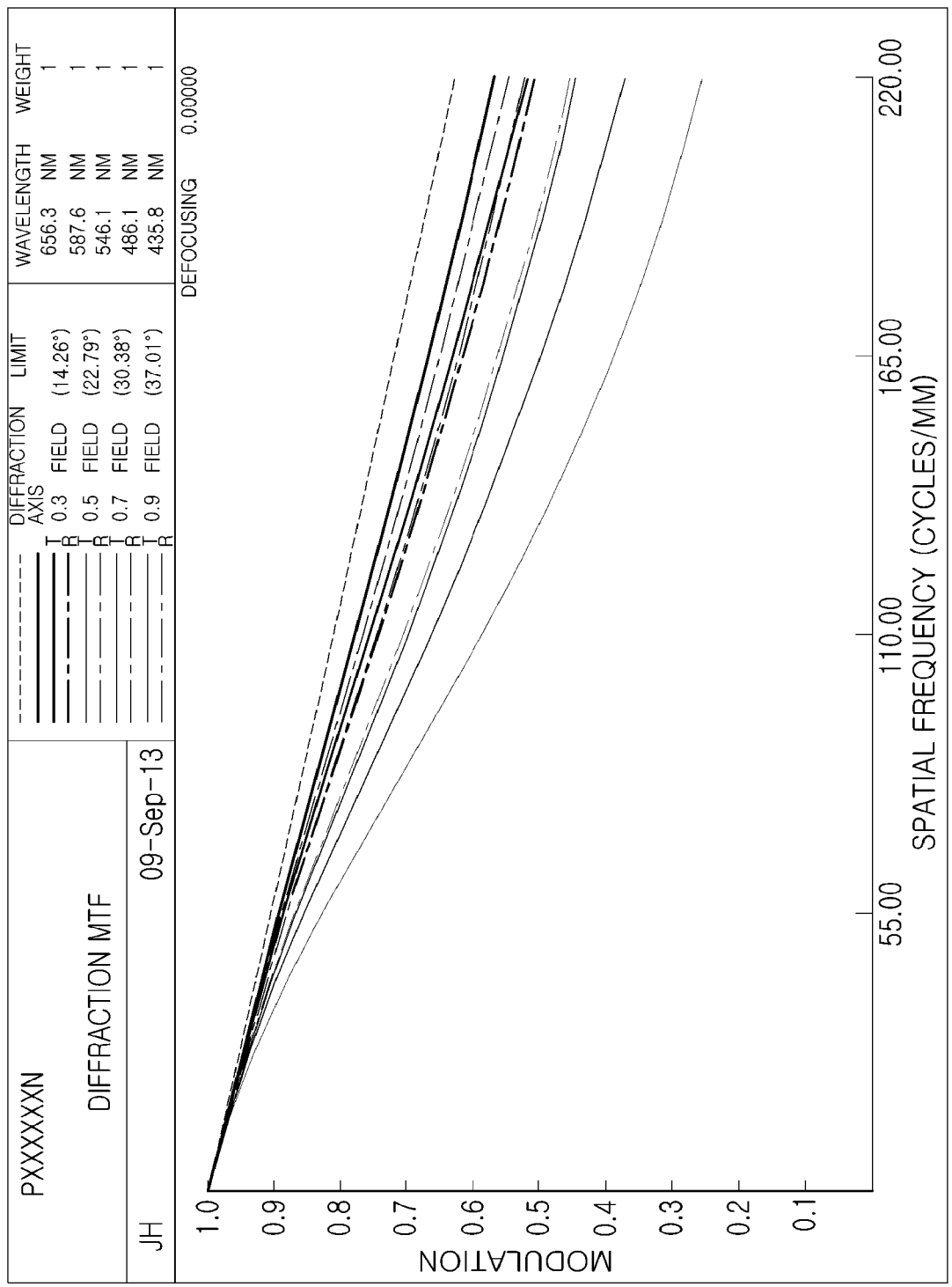
FIG. 20 is a graph showing a MTF of the lens module shown in FIG. 19.
Figure 21:
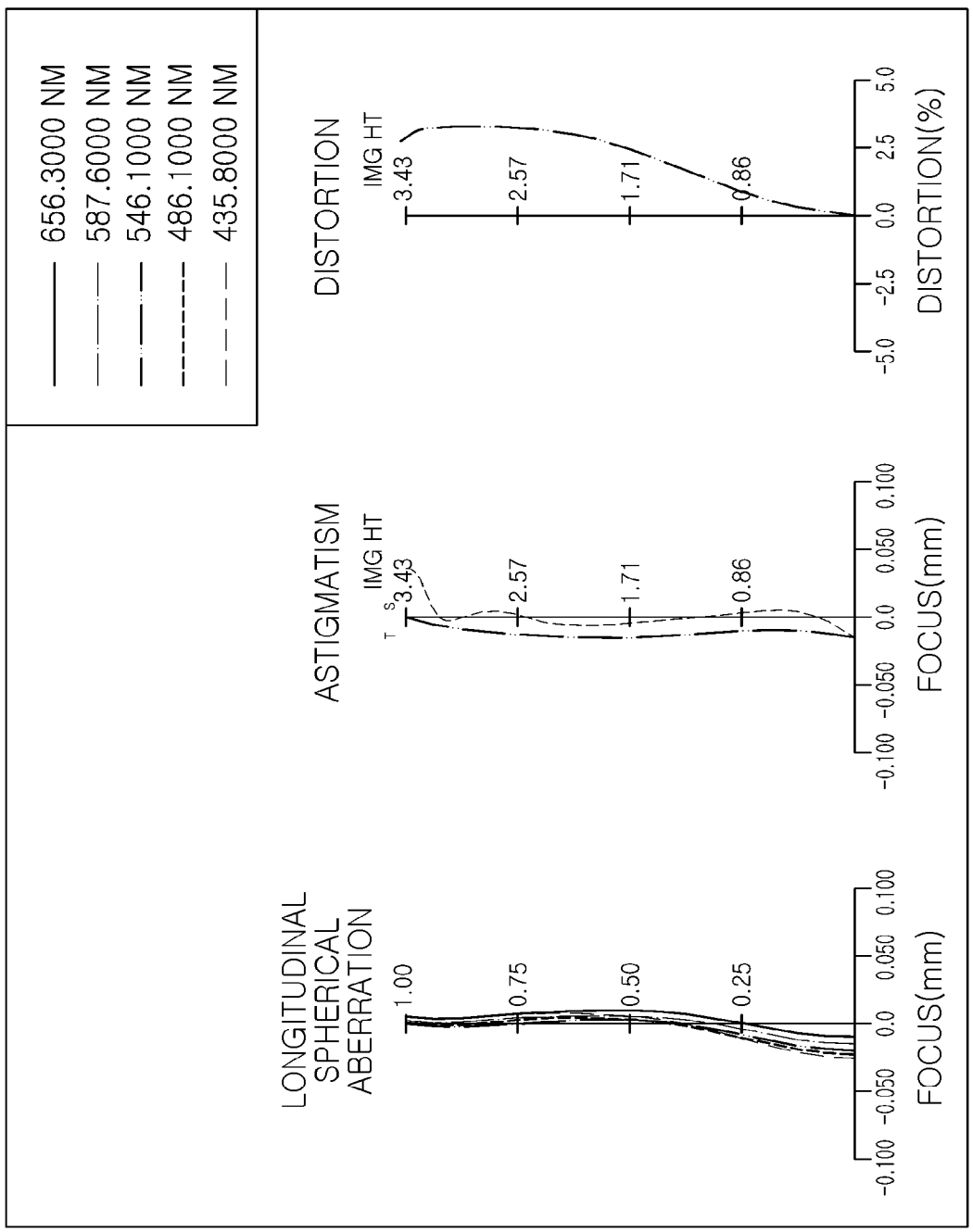
FIG. 21 is graphs showing aberration characteristics of the lens module shown in FIG. 19.

FIG. 1 is a configuration diagram of a lens module according to a first exemplary embodiment of the present disclosure, FIG. 2 is a graph showing a modulation transfer function (MTF) of the lens module shown in FIG. 1, FIG. 3 is graphs showing aberration characteristics of the lens module shown in FIG. 1, FIG. 4 is a configuration diagram of a lens module according to a second exemplary embodiment of the present disclosure, FIG. 5 is a graph showing a MTF of the lens module shown in FIG. 4, FIG. 6 is graphs showing aberration characteristics of the lens module shown in FIG. 4, FIG. 7 is a configuration diagram of a lens module according to a third exemplary embodiment of the present disclosure, FIG. 8 is a graph showing a MTF of the lens module shown in FIG. 7, FIG. 9 is graphs showing aberration characteristics of the lens module shown in FIG. 7, FIG. 10 is a configuration diagram of a lens module according to a fourth exemplary embodiment of the present disclosure, FIG. 11 is a graph showing a MTF of the lens module shown in FIG. 10, FIG. 12 is graphs showing aberration characteristics of the lens module shown in FIG. 10, FIG. 13 is a configuration diagram of a lens module according to a fifth exemplary embodiment of the present disclosure, FIG. 14 is a graph showing a MTF of the lens module shown in FIG. 13, FIG. 15 is graphs showing aberration characteristics of the lens module shown in FIG. 13, FIG. 16 is a configuration diagram of a lens module according to a sixth exemplary embodiment of the present disclosure, FIG. 17 is a graph showing a MTF of the lens module shown in FIG. 16, FIG. 18 is graphs showing aberration characteristics of the lens module shown in FIG. 16, FIG. 19 is a configuration diagram of a lens module according to a seventh exemplary embodiment of the present disclosure, FIG. 20 is a graph showing a MTF of the lens module shown in FIG. 19, and FIG. 21 is graphs showing aberration characteristics of the lens module shown in FIG. 19.

A lens module according to the present disclosure may include an optical system including seven lenses. The lens module may include a first lens, a second lens, a third lens, a fourth lens, a fifth lens, a sixth lens, and a seventh lens. The lens module may further include other components or additional one or more lenses if necessary. For example, the lens module may include a stop for controlling an amount of light. In addition, the lens module may further include an infrared cut-off filter for cutting off an infrared ray. Further, the lens module may include an image sensor (that is, an imaging device) converting an image of a subject incident through the optical system into an electrical signal or data. The lens module may further include an interval maintaining member adjusting an interval between lenses. In addition to seven lenses, one or more lenses may be arranged in front of the first lens, behind the seventh lens, or between the first and seventh lenses.

At least one of the first to seventh lenses may be formed of plastic. For example, the first and seventh lenses may be formed of plastic, and the other lenses may be formed of a different material. However, materials of the first to seventh lenses are not limited to the above-mentioned materials. For example, all of the first to seventh lenses may be formed of plastic.

At least one of the object-side surface and image-side surface of at least one of the first to seventh lenses may be aspheric. For example, the object-side surfaces or image-side surfaces of the first to seventh lenses may be aspheric. As another example, the both of the surfaces (the object-side surfaces and image-side surfaces) of the first to seventh lenses may be aspheric. The aspheric surface of each of the lenses may be represented by Equation 1.

$$Z = \frac{cY^2}{1 + \sqrt{1-(1+K)c^2 Y^2}} + AY^4 + BY^6 + CY^8 + DY^{10} + EY^{12} + FY^{14} + \ldots \quad \text{[Equation 1]}$$

In Equation 1, Z indicates the height of a point on the aspheric surface at a distance Y from the optical axis relative to the tangential plane at the aspheric surface vertex, c indicates curvature (1/r), k indicates a conic constant, and Y indicates a distance from the point on the curve of the aspheric surface to the optical axis. Constants A to J sequentially indicate 4th-order to 20th-order aspheric coefficients.

In the lens module according to an exemplary embodiment of the present disclosure, the optical system including the first to seventh lenses may satisfy Conditional Expression 1:

$1.0 < f12/f < 2.0$                [Conditional Expression 1]

Here, f12 is a synthetic focal length [mm] of the first and second lenses, and f is an overall focal length [mm] of the optical system.

Here, Conditional Expression 1 may be a numerical range for optimizing refractive power of the first and second lenses. For example, in the case in which the value of f12/f is below the lower limit value of Conditional Expression 1, refractive power may become large, such that it may be difficult to correct spherical aberration. On the contrary, in the case in which the value of f12/f is greater than the upper limit value of the Conditional Expression 1, the lens module may be advantageous for correcting aberration, but it may be difficult to miniaturize the optical system.

In the lens module according to an exemplary embodiment of the present disclosure, the optical system including the first to seventh lenses may satisfy Conditional Expression 2:

$TTL/f < 1.40$                [Conditional Expression 2]

Here, TTL is a distance [mm] from an object-side surface of the first lens to an image surface, and f is the overall focal length [mm] of the optical system.

Conditional Expression 2 may be a numerical range for miniaturizing the lens module. For example, in the case in which the value of TTL/f is greater than the upper limit value of Conditional Expression 2, it may be difficult to miniaturize the lens module.

In the lens module according to an exemplary embodiment of the present disclosure, the optical system including the first to seventh lenses may satisfy Conditional Expression 3:

$BFL/f > 0.2$                [Conditional Expression 3]

Here, BFL is a distance [mm] from an image-side surface of the seventh lens to the image surface, and f is the overall focal length [mm] of the optical system.

Conditional Expression 3 may be a numerical range for optimizing the manufacturing convenience of the lens module. For example, in the case in which the value of BFL/f is below the lower limit value of Conditional Expression 3, a distance between the seventh lens and the image surface may not be secured and it may be difficult to actually manufacture the lens module.

In the lens module according to an exemplary embodiment of the present disclosure, an optical system including the first to seventh lenses may satisfy Conditional Expression 4:

$R1/f > 0.35$                [Conditional Expression 4]

Here, R1 is a radius of curvature [mm] of the object-side surface of the first lens, and f is the overall focal length [mm] of the optical system.

Conditional Expression 4 may be a numerical range for optimizing a shape of the first lens. For example, in the case in which the value of R1/f is below the lower limit value of Conditional Expression 4, the radius of curvature may be excessively small, the first lens may be sensitive to a manufacturing tolerance, and it may be not easy to manufacture the first lens.

In the lens module according to an exemplary embodiment of the present disclosure, an optical system including the first to seventh lenses may satisfy Conditional Expression 5:

$$-0.6 < (R11-R12)/(R11+R12) < 8.0 \quad \text{[Conditional Expression 5]}$$

Here, R11 is a radius of curvature [mm] of the object-side surface of the sixth lens, and R12 is a radius of curvature [mm] of the image-side surface of the sixth lens.

Conditional Expression 5 may be a numerical range for optimizing a shape of the sixth lens. For example, in the case in which the value of (R11−R12)/(R11+R12) goes out of the numerical range of Conditional Expression 5, a deviation between the radii of curvature of the object-side surface and the image-side surface of the sixth lens may be large, and the sixth lens may be disadvantageous for correcting aberration.

In the lens module according to an exemplary embodiment of the present disclosure, the optical system including the first to seventh lenses may satisfy Conditional Expression 6:

$$-2.0 < R13/f < 1.0 \quad \text{[Conditional Expression 6]}$$

Here, R13 is a radius of curvature [mm] of the object-side surface of the seventh lens.

Conditional Expression 6 may be a numerical range for optimizing a shape of the seventh lens. For example, in the case in which the value of R13/f goes out of the numerical range of Conditional Expression 6, it may be difficult to manufacture the seventh lens, and an effect of correcting aberration may be reduced.

In the lens module according to an exemplary embodiment of the present disclosure, the optical system including the first to seventh lenses may satisfy Conditional Expression 7:

$$-10.0 < (R5-R6)/(R5+R6) < 14.0 \quad \text{[Conditional Expression 7]}$$

Here, R5 is a radius of curvature [mm] of the object-side surface of the third lens, and R6 is a radius of curvature [mm] of the image-side surface of the third lens.

For example, in the case in which the value of (R5−R6)/(R5+R6) goes out of the numerical range of Conditional Expression 7, a deviation between the radii of curvature of the object-side surface and the image-side surface of the third lens may be large, and the third lens may be disadvantageous for correcting aberration.

In the lens module according to an exemplary embodiment of the present disclosure, the optical system including the first to seventh lenses may satisfy Conditional Expression 8:

$$ANG/f > 15.0 \quad \text{[Conditional Expression 8]}$$

Here, ANG is an angle of view of the lens module, and f is the overall focal length [mm] of the optical system including the first to seventh lenses.

For example, in the case in which the value of ANG/f is below the lower limit value of Conditional Expression 8, the lens module may be disadvantageous for providing a wide angle of view.

In the lens module according to an exemplary embodiment of the present disclosure, an optical system including the first to seventh lenses may satisfy Conditional Expression 9:

$$|f1| < |f3| \quad \text{[Conditional Expression 9]}$$

Here, f1 is the focal length [mm] of the first lens, and f3 is the focal length [mm] of the third lens.

Hereinafter, the first to seventh lenses of the lens module according to an exemplary embodiment of the present disclosure will be described.

The first lens may have refractive power. For example, the refractive power of the first lens may be positive. The first lens may be formed of plastic. However, the material of the first lens is not limited to plastic. For example, different materials which may transmit light may be used to make the first lens. A first surface of the first lens may be convex, and a second surface thereof may be concave. For example, the first lens may have a meniscus shape in which it is convex toward the object side or a plano-convex shape in which one surface is convex. However, the shape of the first lens is not limited to the above-mentioned shape. For example, the second surface of the first lens may be convex if necessary. At least one of the first and second surfaces of the first lens may be aspheric. For example, the first or second surface of the first lens or both surfaces thereof may be aspheric.

The second lens may have refractive power. For example, the refractive power of the second lens may be positive or negative. The second lens may be formed of plastic. However, the material of the second lens is not limited to plastic. For example, different materials which may transmit light may be used to make the second lens. A first surface of the second lens may be convex, and a second surface thereof may be concave. For example, the second lens may have a meniscus shape in which it is convex toward the object side. However, the shape of the second lens is not limited to the above-mentioned shape. For example, the first surface of the second lens may be concave if necessary. At least one of the first and second surfaces of the second lens may be aspheric. For example, the first or second surface of the second lens or both surfaces thereof may be aspheric.

The third lens may have refractive power. For example, the refractive power of the third lens may be positive or negative. The third lens may be formed of plastic. However, the material of the third lens is not limited to plastic. For example, different materials which may transmit light may be used to make the third lens. Both surfaces of the third lens may be convex. However, the shape of the third lens is not limited to the above-mentioned shape. For example, the third lens may have a shape in which an optical axis portion of the object-side surface thereof is convex, and the peripheral portion of the object-side surface thereof is concave. In addition, a second surface of the third lens may be concave. At least one of the first and second surfaces of the third lens may be aspheric. For example, the first or second surface of the third lens or both surfaces thereof may be aspheric.

The fourth lens may have refractive power. For example, the refractive power of the fourth lens may be positive or negative. The fourth lens may be formed of plastic. However, the material of the fourth lens is not limited to the plastic. For example, different materials which may transmit light may be used to make the fourth lens. A first surface of the fourth lens may be concave, and a second surface thereof may be convex. For example, the fourth lens may have a meniscus shape in which it is convex toward the image side. However, the shape of the fourth lens is not limited to the above-mentioned shape. The fourth lens may have different shapes, for instance, that the first surface of the fourth lens is concave, and the second surface thereof is convex. At least one of the first and second surfaces of the fourth lens may be aspheric. For example, the first or second surface of the fourth lens or both surfaces thereof may be aspheric.

The fifth lens may have refractive power. For example, the refractive power of the fifth lens may be positive or negative. The fifth lens may be formed of plastic. However, the material of the fifth lens is not limited to plastic. For example, different materials which may transmit light may be used to make the fifth lens. A first surface of the fifth lens may be concave, and a second surface thereof may be convex. For example, the fifth lens may have a meniscus shape in which it is convex toward the image side. At least one of the first and second surfaces of the fifth lens may be aspheric. For example, the first or second surface of the fifth lens or both surfaces thereof may be aspheric.

The sixth lens may have refractive power. For example, the refractive power of the sixth lens may be positive or negative. The sixth lens may be formed of plastic. However, the material of the sixth lens is not limited to plastic. For example, different materials which may transmit light may be used to make the sixth lens. A first surface of the sixth lens may be convex and a second surface thereof may be concave. However, the shape of the sixth lens is not limited to the above-mentioned shape. The sixth lens may have various shapes, for instance, that the first surface thereof is concave, and the second surface thereof is convex. In addition, the sixth lens may have a shape in which an inflection point is formed on at least one of the first and second surfaces thereof. For example, the second surface of the sixth lens may be concave at the center of an optical axis and become convex toward an edge thereof. At least one of the first and second surfaces of the sixth lens or both surfaces thereof may be aspheric.

The seventh lens may have refractive power. For example, the refractive power of the seventh lens may be negative. The seventh lens may be formed of plastic. However, the material of the seventh lens is not limited to plastic. For example, different materials which may transmit light may be used to make the seventh lens. A first surface of the seventh lens may be convex, and a second surface thereof may be concave. However, the shape of the seventh lens is not limited to the above-mentioned shape. The seventh lens may have various shapes, for instance, in which both surfaces thereof are concave. The seventh lens may have a shape in which an inflection point is formed on at least one of the first and second surfaces thereof. For example, the second surface of the seventh lens may be concave at the center of an optical axis and become convex toward an edge thereof. At least one of the first and second surfaces of the seventh lens or both surfaces thereof may be aspheric.

Some embodiments of the lens module configured as described above may decrease aberration which causes image quality deterioration. Further, some embodiments of the lens module configured as described above may improve lightness and reduce a manufacturing cost.

Hereinafter, lens modules according to the first to seventh exemplary embodiments of the present disclosure will be described.

Firstly, the lens module according to the first exemplary embodiment (Example 1) of the present disclosure will be described with reference to FIGS. 1 through 3.

The lens module 100 according to this exemplary embodiment may include a first lens 10, a second lens 20, a third lens 30, a fourth lens 40, a fifth lens 50, a sixth lens 60, and a seventh lens 70. The lens module 100 may further include an infrared cut-off filter 80 and an image sensor 90. Additionally, the lens module 100 may include at least one aperture stop (not shown). The aperture stop (not shown) may be arranged in front of the first lens 10 or anywhere between the first lens 10 and the seventh lens 70. For reference, an overall focal length f of the lens module 100 may be 4.543 [mm], a focal length of the first lens 10 may be 4.199, a focal length of the second lens 20 may be −9.17, a focal length of the third lens 30 may be 4.903, a focal length of the fourth lens 40 may be −6.400, a focal length of the fifth lens 50 may be −124.921, a focal length of the sixth lens 60 may be 27.141, and a focal length of the seventh lens 70 may be −14.863.

Table 1 below shows radii of curvature of the lenses, thicknesses of the lenses or distances between the lenses, refractive indices of the lenses, and abbe numbers of the lenses. More specifically, values in a horizontal row corresponding to S1 in a vertical column sequentially indicate a radius R1 of curvature of a first surface of the first lens 10, a thickness of the first lens 10, a refractive index of the first lens 10, and an abbe number of first lens 10. In addition, values in a horizontal row corresponding to S2 in a vertical column sequentially indicate a radius R2 of curvature of a second surface of the first lens 10 and a distance between the first lens 10 and the second lens 20. Similarly, values in a horizontal row corresponding to S3 in a vertical column sequentially indicate a radius R3 of curvature of a first surface of the second lens 20, a thickness of the second lens 20, a refractive index of the second lens 20, and an abbe number of second lens 20. In addition, values in a horizontal row corresponding to S4 in a vertical column sequentially indicate a radius R4 of curvature of a second surface of the second lens 20 and a distance between the second lens 20 and the third lens 30. For reference, radii R5 to R14 of curvature of the third to seventh lenses, thickness of the third to seventh lenses or distances between the third to seventh lenses, refractive indices of the lenses, and abbe numbers of the third to seventh lenses are shown in the same scheme as described above.

Table 2 below indicates an aspheric constant of each of the lenses. In detail, the first horizontal axis in Table 2 indicates first and second surfaces of each of the lenses. For example, number 2 in the first horizontal row indicates the first surface of the first lens 10 and number 3 in the first horizontal axis indicates the second surface of the first lens 10. In addition, number 4 in the first horizontal row indicates the first surface of the second lens 20 and number 5 in the first horizontal axis indicates the second surface of the second lens 20. Similarly, numbers 6 to 15 in the first horizontal axis indicate first and second surfaces of the third to seventh lenses, respectively.

In this exemplary embodiment, the first lens 10 may have positive refractive power. The first surface of the first lens 10 may be convex, and the second surface thereof may be concave. The second lens 20 may have negative refractive power. The first surface of the second lens 20 may be convex, and the second surface thereof may be concave. The third lens 30 may have positive refractive power. Both surfaces of the third lens 30 may be convex. The fourth lens 40 may have negative refractive power. The first surface of the fourth lens 40 may be concave, and the second surface thereof may be convex. That is, the fourth lens 40 may have a meniscus shape in which it is convex toward an image side. The fifth lens 50 may have negative refractive power. The first surface of the fifth lens 50 may be concave, and the second surface thereof may be convex. That is, the fifth lens 50 may have a meniscus shape in which it is convex toward the image side. The sixth lens 60 may have positive refractive power. In addition, the first surface of the sixth lens 60 may be convex, and the second surface thereof may be concave. The sixth lens 60 may have inflection points formed on the first and second surfaces thereof, respectively. The seventh lens 70 may have negative refractive power. The first surface of the seventh lens 70 may be convex, and the second surface thereof may be concave. Further, the seventh lens 70 may have an inflection point formed on the second surface thereof.

The exemplary embodiment of the lens module configured as described above may have MTF characteristics and aberration characteristics as shown in FIGS. 2 and 3, respectively.

TABLE 1

| Example 1 | Radius of Curvature | Thickness/ Distance | Reflactive Index | Abbe number |
|---|---|---|---|---|
| Object | Infinity | Infinity | | |
| 1 | Infinity | 0.050 | | |
| 2 | 1.8598 | 0.518 | 1.544 | 56.1 |
| 3 | 9.0224 | 0.105 | | |
| 4 | 3.9767 | 0.220 | 1.635 | 24.0 |
| 5 | 2.3118 | 0.327 | | |
| 6 | 6.3324 | 0.470 | 1.544 | 56.1 |
| 7 | −4.4884 | 0.341 | | |
| 8 | −1.2726 | 0.220 | 1.635 | 24.0 |
| 9 | −1.9772 | 0.162 | | |
| 10 | −1.5843 | 0.220 | 1.544 | 56.1 |
| 11 | −1.7015 | 0.100 | | |
| 12 | 2.6609 | 0.519 | 1.635 | 24.0 |
| 13 | 2.9085 | 0.371 | | |
| 14 | 2.34792 | 0.641 | 1.544 | 56.1 |
| 15 | 1.64465 | 0.438 | | |
| 16 | Infinity | 0.300 | 1.517 | 64.2 |
| 17 | Infinity | 0.503 | | |
| Image | | | | | length f of the lens module 100 may be 4.462 [mm], a focal length of the first lens 10 may be 3.742, a focal length of the second lens 20 may be −7.998, a focal length of the third lens 30 may be 5.553, a focal length of the fourth lens 40 may be −8.276, a focal length of the fifth lens 50 may be 104.962, a focal length of the sixth lens 60 may be 517.567, and a focal length of the seventh lens 70 may be −12.343.

Table 3 below shows radii of curvature of the lenses, thicknesses of the lenses or distances between the lenses, refractive indices of the lenses, and abbe numbers of the lenses. Table 4 below indicates an aspheric constant of each surface of the lenses.

In this exemplary embodiment, the first lens 10 may have positive refractive power. A first surface of the first lens 10 may be convex, and a second surface thereof may be concave. The second lens 20 may have negative refractive power. A first surface of the second lens 20 may be convex, and a second surface thereof may be concave. The third lens 30 may have positive refractive power. Both surfaces of the third lens 30 may be convex. The fourth lens 40 may have negative refractive power. A first surface of the fourth lens 40 may be concave, and a second surface thereof may be convex. That is, the fourth lens 40 may have a meniscus shape in which it is convex toward an image side. The fifth lens 50 may have positive refractive power. A first surface of the fifth lens 50 may be concave, and a second surface thereof may be convex. That is, the fifth lens 50 may have a meniscus shape in which it is convex toward the image side. The sixth lens 60 may have positive refractive power.

TABLE 2

| Example 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Y Radius | 1.860 | 9.022 | 3.977 | 2.312 | 6.332 | −4.488 | −1.273 | −1.977 | −1.584 | −1.702 | 2.661 | 2.909 | 2.348 | 1.645 |
| Conic Constant (K) | 0.000 | 0.000 | 0.000 | −8.131 | 0.000 | 0.000 | −1.897 | −0.498 | 0.055 | −0.432 | 0.000 | 0.000 | −14.574 | −7.680 |
| 4th-order Coeffient(A) | −0.015 | −0.140 | −0.256 | −0.120 | −0.090 | −0.055 | −0.026 | −0.026 | 0.058 | 0.038 | −0.088 | −0.098 | −0.144 | −0.086 |
| 6th-order Coeffient(B) | 0.003 | 0.238 | 0.528 | 0.332 | 0.010 | −0.012 | 0.023 | 0.030 | 0.011 | 0.016 | −0.010 | 0.016 | 0.023 | 0.022 |
| 8th-order Coeffient(C) | −0.065 | −0.381 | −0.639 | −0.347 | −0.022 | 0.014 | −0.017 | −0.011 | 0.002 | 0.003 | 0.015 | −0.004 | 0.007 | −0.003 |
| 10th-order Coeffient(D) | 0.073 | 0.289 | 0.477 | 0.222 | 0.022 | −0.018 | 0.011 | −0.002 | 0.002 | −0.004 | −0.009 | 0.000 | −0.003 | 0.000 |
| 12th-order Coeffient(E) | −0.067 | −0.116 | −0.168 | −0.047 | −0.020 | 0.024 | −0.001 | 0.003 | 0.001 | 0.001 | 0.002 | 0.000 | 0.000 | 0.000 |
| 14th-order Coeffient(F) | 0.013 | 0.015 | 0.019 | 0.000 | 0.019 | −0.010 | −0.002 | 0.001 | 0.000 | 0.000 | 0.000 | 0.000 | 0.000 | 0.000 |
| 16th-order Coeffient(G) | | | | | | | | | | | | | | |
| 18th-order Coeffient(H) | | | | | | | | | | | | | | |
| 20th-order Coeffient(J) | | | | | | | | | | | | | | |

The lens module according to the second exemplary embodiment (Example 2) of the present disclosure will be described with reference to FIGS. 4 through 6.

The lens module 100 according to this exemplary embodiment may include a first lens 10, a second lens 20, a third lens 30, a fourth lens 40, a fifth lens 50, a sixth lens 60, and a seventh lens 70. The lens module 100 may further include an infrared cut-off filter 80 and an image sensor 90. Further, the lens module 100 may include at least one aperture stop (not shown). The aperture stop (not shown) may be arranged in front of the first lens 10 or anywhere between the first lens 10 and the seventh lens 70. For reference, an overall focal A first surface of the sixth lens 60 may be convex, and a second surface thereof may be concave. In addition, the sixth lens 60 may have inflection points formed on the first and second surfaces thereof, respectively. The seventh lens 70 may have negative refractive power. A first surface of the seventh lens 70 may be convex, and a second surface thereof may be concave. Further, the seventh lens 70 may have an inflection point formed on the second surface thereof.

The exemplary embodiment of the lens module configured as described above may have MTF characteristics and aberration characteristics as shown in FIGS. 5 and 6, respectively.

TABLE 3

| Example 2 | Radius of Curvature | Thickness/ Distance | Reflactive Index | Abbe number |
|---|---|---|---|---|
| Object | Infinity | Infinity | | |
| 1 | Infinity | 0.050 | | |
| 2 | 1.823 | 0.592 | 1.544 | 56.1 |
| 3 | 15.421 | 0.100 | | |
| 4 | 4.172 | 0.220 | 1.635 | 24.0 |
| 5 | 2.244 | 0.375 | | |
| 6 | 7.162 | 0.467 | 1.544 | 56.1 |
| 7 | −5.106 | 0.336 | | |
| 8 | −1.312 | 0.240 | 1.635 | 24.0 |
| 9 | −1.872 | 0.158 | | |
| 10 | −1.566 | 0.242 | 1.544 | 56.1 |
| 11 | −1.607 | 0.100 | | |
| 12 | 2.899 | 0.497 | 1.635 | 24.0 |
| 13 | 2.731 | 0.290 | | |
| 14 | 3.143 | 0.724 | 1.544 | 56.1 |
| 15 | 1.967 | 0.265 | | |
| 16 | Infinity | 0.300 | 1.517 | 64.2 |
| 17 | Infinity | 0.501 | | |
| Image | | | | |

TABLE 4

| Example 2 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Y Radius | 1.823 | 15.421 | 4.172 | 2.244 | 7.162 | −5.106 | −1.312 | −1.872 | −1.566 | −1.607 | 2.899 | 2.731 | 3.143 | 1.967 |
| Conic Constant (K) | 0.000 | 0.000 | 0.000 | −7.071 | 0.000 | 0.000 | −1.313 | −0.514 | 0.046 | −0.462 | 0.000 | 0.000 | −22.646 | −8.489 |
| 4th-order Coeffient(A) | −0.010 | −0.127 | −0.256 | −0.124 | −0.099 | −0.081 | −0.031 | −0.030 | 0.049 | 0.039 | −0.076 | −0.101 | −0.135 | −0.081 |
| 6th-order Coeffient(B) | 0.007 | 0.240 | 0.525 | 0.329 | 0.007 | −0.011 | 0.025 | 0.027 | 0.008 | 0.015 | −0.012 | 0.015 | 0.024 | 0.023 |
| 8th-order Coeffient(C) | −0.062 | −0.370 | −0.640 | −0.347 | −0.024 | 0.013 | −0.018 | −0.010 | 0.000 | 0.002 | 0.014 | −0.004 | 0.007 | −0.004 |
| 10th-order Coeffient(D) | 0.079 | 0.282 | 0.477 | 0.221 | 0.021 | −0.019 | 0.011 | −0.002 | 0.002 | −0.004 | −0.010 | 0.000 | −0.003 | 0.000 |
| 12th-order Coeffient(E) | −0.066 | −0.116 | −0.170 | −0.043 | −0.020 | 0.024 | −0.001 | 0.003 | 0.002 | 0.001 | 0.002 | 0.000 | 0.000 | 0.000 |
| 14th-order Coeffient(F) | 0.014 | 0.017 | 0.021 | 0.000 | 0.021 | −0.009 | −0.001 | 0.001 | 0.000 | 0.000 | 0.000 | 0.000 | 0.000 | 0.000 |
| 16th-order Coeffient(G) | | | | | | | | | | | | | | |
| 18th-order Coeffient(H) | | | | | | | | | | | | | | |
| 20th-order Coeffient(J) | | | | | | | | | | | | | | |

The lens module according to the third exemplary embodiment (Example 3) of the present disclosure will be described with reference to FIGS. 7 through 9.

The lens module 100 according to this exemplary embodiment may include a first lens 10, a second lens 20, a third lens 30, a fourth lens 40, a fifth lens 50, a sixth lens 60, and a seventh lens 70. The lens module 100 may further include an infrared cut-off filter 80 and an image sensor 90. Further, the lens module 100 may include at least one aperture stop (not shown). The aperture stop (not shown) may be arranged in front of the first lens 10 or anywhere between the first lens 10 and the seventh lens 70. For reference, an overall focal length f of the lens module 100 may be 4.271 [mm], a focal length of the first lens 10 may be 3.782, a focal length of the second lens 20 may be −7.960, a focal length of the third lens 30 may be 5.239, a focal length of the fourth lens 40 may be −6.790, a focal length of the fifth lens 50 may be 53.775, a focal length of the sixth lens 60 may be 72.888, and a focal length of the seventh lens 70 may be −15.543.

Table 5 below shows radii of curvature of the lenses, thicknesses of the lenses or distances between the lenses, refractive indices of the lenses, and abbe numbers of the lenses. Table 6 below indicates an aspheric constant of each surface of the lenses.

In this exemplary embodiment, the first lens 10 may have positive refractive power. A first surface of the first lens 10 may be convex, and a second surface thereof may be concave. The second lens 20 may have negative refractive power. A first surface of the second lens 20 may be convex, and a second surface thereof may be concave. The third lens 30 may have positive refractive power. Both surfaces of the third lens 30 may be convex. The fourth lens 40 may have negative refractive power. A first surface of the fourth lens 40 may be concave, and a second surface thereof may be convex. That is, the fourth lens 40 may have a meniscus shape in which it is convex toward an image side. The fifth lens 50 may have positive refractive power. A first surface of the fifth lens 50 may be concave, and a second surface thereof may be convex. That is, the fifth lens 50 may have a meniscus shape in which it is convex toward the image side. The sixth lens 60 may have positive refractive power. A first surface of the sixth lens 60 may be convex, and a second surface thereof may be concave. In addition, the sixth lens 60 may have inflection points formed on the first and second surfaces thereof, respectively. The seventh lens 70 may have negative refractive power. A first surface of the seventh lens 70 may be convex, and a second surface thereof may be concave. Further, the seventh lens 70 may have an inflection point formed on the second surface thereof.

The exemplary embodiment of the lens module configured as described above may have MTF characteristics and aberration characteristics as shown in FIGS. 8 and 9, respectively.

TABLE 5

| Example 3 | Radius of Curvature | Thickness/ Distance | Reflactive Index | Abbe number |
|---|---|---|---|---|
| Object | Infinity | Infinity | | |
| 1 | Infinity | 0.050 | | |
| 2 | 1.802 | 0.540 | 1.544 | 56.1 |
| 3 | 13.001 | 0.104 | | |
| 4 | 4.169 | 0.242 | 1.635 | 24.0 |
| 5 | 2.233 | 0.301 | | |
| 6 | 6.476 | 0.398 | 1.544 | 56.1 |

TABLE 5-continued

| Example 3 | Radius of Curvature | Thickness/ Distance | Reflactive Index | Abbe number |
|---|---|---|---|---|
| 7 | −4.982 | 0.347 | | |
| 8 | −1.252 | 0.240 | 1.635 | 24.0 |
| 9 | −1.895 | 0.164 | | |
| 10 | −1.547 | 0.242 | 1.544 | 56.1 |
| 11 | −1.551 | 0.100 | | |
| 12 | 2.535 | 0.554 | 1.635 | 24.0 |
| 13 | 2.455 | 0.281 | | |
| 14 | 2.075 | 0.537 | 1.544 | 56.1 |
| 15 | 1.514 | 0.252 | | |
| 16 | Infinity | 0.300 | 1.517 | 64.2 |
| 17 | Infinity | 0.600 | | |
| Image | | | | | power. A first surface of the second lens 20 may be convex, and a second surface thereof may be concave. The third lens 30 may have positive refractive power. Both surfaces of the third lens 30 may be convex. The fourth lens 40 may have negative refractive power. A first surface of the fourth lens 40 may be concave, and a second surface thereof may be convex. That is, the fourth lens 40 may have a meniscus shape in which it is convex toward an image side. The fifth lens 50 may have positive refractive power. A first surface of the fifth lens 50 may be concave, and a second surface thereof may be convex. That is, the fifth lens 50 may have a meniscus shape in which it is convex toward the image side. The sixth lens 60 may have negative refractive power. A first surface of the sixth lens 60 may be convex, and a second surface thereof may be concave. In addition, the

TABLE 6

| Example 3 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Y Radius | 1.802 | 13.001 | 4.169 | 2.233 | 6.476 | −4.982 | −1.252 | −1.895 | −1.547 | −1.551 | 2.535 | 2.455 | 2.075 | 1.514 |
| Conic Constant (K) | 0.000 | 0.000 | 0.000 | −7.719 | 0.000 | 0.000 | −2.215 | −0.619 | 0.052 | −0.350 | 0.000 | 0.000 | −15.289 | −8.510 |
| 4th-order Coeffient(A) | −0.014 | −0.145 | −0.258 | −0.120 | −0.101 | −0.047 | −0.027 | −0.023 | 0.051 | 0.048 | −0.092 | −0.107 | −0.134 | −0.089 |
| 6th-order Coeffient(B) | −0.001 | 0.239 | 0.524 | 0.331 | 0.012 | −0.016 | 0.020 | 0.032 | 0.014 | 0.017 | −0.008 | 0.017 | 0.022 | 0.023 |
| 8th-order Coeffient(C) | −0.064 | −0.383 | −0.639 | −0.348 | −0.023 | 0.012 | −0.019 | −0.011 | 0.004 | 0.003 | 0.015 | −0.004 | 0.007 | −0.003 |
| 10th-order Coeffient(D) | 0.073 | 0.286 | 0.477 | 0.220 | 0.022 | −0.019 | 0.010 | −0.002 | 0.003 | −0.004 | −0.010 | 0.000 | −0.003 | 0.000 |
| 12th-order Coeffient(E) | −0.069 | −0.119 | −0.170 | −0.046 | −0.020 | 0.024 | −0.002 | 0.004 | 0.001 | 0.001 | 0.002 | 0.000 | 0.000 | 0.000 |
| 14th-order Coeffient(F) | 0.009 | 0.015 | 0.021 | 0.000 | 0.022 | −0.009 | −0.002 | 0.001 | 0.000 | 0.000 | 0.000 | 0.000 | 0.000 | 0.000 |
| 16th-order Coeffient(G) | | | | | | | | | | | | | | |
| 18th-order Coeffient(H) | | | | | | | | | | | | | | |
| 20th-order Coeffient(J) | | | | | | | | | | | | | | |

The lens module according to the fourth exemplary embodiment (Example 4) of the present disclosure will be described with reference to FIGS. 10 through 12.

The lens module 100 according to this exemplary embodiment may include a first lens 10, a second lens 20, a third lens 30, a fourth lens 40, a fifth lens 50, a sixth lens 60, and a seventh lens 70. The lens module 100 may further include an infrared cut-off filter 80 and an image sensor 90. Further, the lens module 100 may further include at least one aperture stop (not shown). The aperture stop (not shown) may be arranged in front of the first lens 10 or anywhere between the first lens 10 and the seventh lens 70. For reference, an overall focal length f of the lens module 100 may be 4.300 [mm], a focal length of the first lens 10 may be 5.204, a focal length of the second lens 20 may be 1000.000, a focal length of the third lens 30 may be 4.026, a focal length of the fourth lens 40 may be −4.520, a focal length of the fifth lens 50 may be 7.456, a focal length of the sixth lens 60 may be −31.268, and a focal length of the seventh lens 70 may be −5.024.

Table 7 below shows radii of curvature of the lenses, thicknesses of the lenses or distances between the lenses, refractive indices of the lenses, and abbe numbers of the lenses. Table 8 below indicates an aspheric constant of each of the lenses.

In this exemplary embodiment, the first lens 10 may have positive refractive power. A first surface of the first lens 10 may be convex, and a second surface thereof may be concave. The second lens 20 may have positive refractive sixth lens 60 may have inflection points formed on the first and second surfaces thereof, respectively. The seventh lens 70 may have negative refractive power. A first surface of the seventh lens 70 may be concave, and a second surface thereof may be concave. Further, the seventh lens 70 may have an inflection point formed on the second surface thereof.

The exemplary embodiment of the lens module configured as described above may have MTF characteristics and aberration characteristics as shown in FIGS. 11 and 12, respectively.

TABLE 7

| Example 4 | Radius of Curvature | Thickness/ Distance | Reflactive Index | Abbe number |
|---|---|---|---|---|
| Object | Infinity | Infinity | | |
| 1 | Infinity | 0.050 | | |
| 2 | 1.946 | 0.426 | 1.544 | 56.1 |
| 3 | 5.740 | 0.102 | | |
| 4 | 5.025 | 0.250 | 1.635 | 24.0 |
| 5 | 4.968 | 0.222 | | |
| 6 | 16.021 | 0.471 | 1.544 | 56.1 |
| 7 | −2.512 | 0.188 | | |
| 8 | −1.396 | 0.570 | 1.635 | 24.0 |
| 9 | −3.150 | 0.174 | | |
| 10 | −1.832 | 0.340 | 1.544 | 56.1 |
| 11 | −1.344 | 0.100 | | |
| 12 | 3.272 | 0.576 | 1.635 | 24.0 |
| 13 | 2.617 | 0.590 | | |

TABLE 7-continued

| Example 4 | Radius of Curvature | Thickness/ Distance | Reflactive Index | Abbe number |
|---|---|---|---|---|
| 14 | −5.948 | 0.501 | 1.544 | 56.1 |
| 15 | 5.208 | 0.139 | | |
| 16 | Infinity | 0.300 | 1.517 | 64.2 |
| 17 | Infinity | 0.489 | | |
| Image | | | | |

TABLE 8

| Example 4 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Y Radius | 1.946 | 5.740 | 5.025 | 4.968 | 16.021 | −2.512 | −1.396 | −3.150 | −1.832 | −1.344 | 3.272 | 2.617 | −5.948 | 5.208 |
| Conic Constant (K) | 0.000 | 0.000 | 0.000 | −45.000 | 0.000 | 0.000 | −1.319 | 1.905 | −0.184 | −0.759 | 0.000 | 0.000 | −50.000 | −50.000 |
| 4th-order Coeffient(A) | −0.019 | −0.190 | −0.327 | −0.210 | −0.126 | −0.069 | −0.047 | −0.022 | 0.071 | 0.100 | −0.106 | −0.137 | −0.074 | −0.045 |
| 6th-order Coeffient(B) | 0.040 | 0.287 | 0.485 | 0.269 | 0.002 | −0.037 | 0.034 | 0.046 | 0.011 | 0.002 | 0.013 | 0.033 | 0.001 | 0.015 |
| 8th-order Coeffient(C) | −0.098 | −0.403 | −0.617 | −0.347 | −0.070 | 0.004 | −0.014 | −0.010 | −0.001 | 0.006 | 0.006 | −0.005 | 0.007 | −0.003 |
| 10th-order Coeffient(D) | 0.071 | 0.288 | 0.461 | 0.230 | 0.000 | −0.022 | 0.010 | −0.002 | 0.001 | −0.003 | −0.004 | 0.000 | −0.002 | 0.000 |
| 12th-order Coeffient(E) | −0.005 | −0.118 | −0.165 | −0.058 | −0.012 | 0.022 | 0.001 | 0.003 | 0.000 | 0.000 | 0.000 | 0.000 | 0.000 | 0.000 |
| 14th-order Coeffient(F) | −0.040 | 0.004 | 0.015 | 0.000 | 0.023 | −0.009 | −0.004 | 0.000 | 0.000 | 0.000 | 0.000 | 0.000 | 0.000 | 0.000 |
| 16th-order Coeffient(G) | | | | | | | | | | | | | | |
| 18th-order Coeffient(H) | | | | | | | | | | | | | | |
| 20th-order Coeffient(J) | | | | | | | | | | | | | | |

The lens module according to the fifth exemplary embodiment (Example 5) of the present disclosure will be described with reference to FIGS. 13 through 15.

The lens module 100 according to this exemplary embodiment may include a first lens 10, a second lens 20, a third lens 30, a fourth lens 40, a fifth lens 50, a sixth lens 60, and a seventh lens 70. The lens module 100 may further include an infrared cut-off filter 80 and an image sensor 90. Further, the lens module 100 may further include at least one aperture stop (not shown). The aperture stop (not shown) may be arranged in front of the first lens 10 or anywhere between the first lens 10 and the seventh lens 70. For reference, an overall focal length f of the lens module 100 may be 4.522 [mm], a focal length of the first lens 10 may be 4.584, a focal length of the second lens 20 may be −8.221, a focal length of the third lens 30 may be 6.410, a focal length of the fourth lens 40 may be 73.896, a focal length of the fifth lens 50 may be 17.417, a focal length of the sixth lens 60 may be −12.539, and a focal length of the seventh lens 70 may be −6.829.

Table 9 below shows radii of curvature of the lenses, thicknesses of the lenses or distances between the lenses, refractive indices of the lenses, and abbe numbers of the lenses. Table 10 below indicates an aspheric constant of each surface of the lenses.

In this exemplary embodiment, the first lens 10 may have positive refractive power. A first surface of the first lens 10 may be convex, and a second surface thereof may be concave. The second lens 20 may have negative refractive power. A first surface of the second lens 20 may be convex, and a second surface thereof may be concave. The third lens 30 may have positive refractive power. Both surfaces of the third lens 30 may be convex. The fourth lens 40 may have positive refractive power. A first surface of the fourth lens 40 may be concave, and a second surface thereof may be convex. That is, the fourth lens 40 may have a meniscus shape in which it is convex toward an image side. The fifth lens 50 may have positive refractive power. A first surface of the fifth lens 50 may be concave, and a second surface thereof may be convex. That is, the fifth lens 50 may have a meniscus shape in which it is convex toward the image side. The sixth lens 60 may have negative refractive power. A first surface of the sixth lens 60 may be convex, and a second surface thereof may be concave. In addition, the sixth lens 60 may have inflection points formed on the first and second surfaces thereof, respectively. The seventh lens 70 may have negative refractive power. A first surface of the seventh lens 70 may be convex, and a second surface thereof may be concave. Further, the seventh lens 70 may have an inflection point formed on the second surface thereof.

The exemplary embodiment of the lens module configured as described above may have MTF characteristics and aberration characteristics as shown in FIGS. 14 and 15, respectively.

TABLE 9

| Example 5 | Radius of Curvature | Thickness/ Distance | Reflactive Index | Abbe number |
|---|---|---|---|---|
| Object | Infinity | Infinity | | |
| 1 | Infinity | 0.050 | | |
| 2 | 2.004 | 0.440 | 1.544 | 56.1 |
| 3 | 9.413 | 0.102 | | |
| 4 | 5.035 | 0.220 | 1.635 | 24.0 |
| 5 | 2.520 | 0.305 | | |
| 6 | 4.272 | 0.481 | 1.544 | 56.1 |
| 7 | −18.245 | 0.322 | | |
| 8 | −2.964 | 0.262 | 1.635 | 24.0 |
| 9 | −2.883 | 0.125 | | |
| 10 | −2.348 | 0.329 | 1.544 | 56.1 |
| 11 | −1.975 | 0.150 | | |
| 12 | 5.085 | 0.581 | 1.635 | 24.0 |
| 13 | 2.965 | 0.516 | | |
| 14 | 2.794 | 0.500 | 1.544 | 56.1 |
| 15 | 1.494 | 0.317 | | |
| 16 | Infinity | 0.300 | 1.517 | 64.2 |
| 17 | Infinity | 0.503 | | |
| Image | | | | |

TABLE 10

| Example 5 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Y Radius | 2.004 | 9.413 | 5.035 | 2.520 | 4.272 | −18.245 | −2.964 | −2.883 | −2.348 | −1.975 | 5.085 | 2.965 | 2.794 | 1.494 |
| Conic Constant (K) | 0.000 | 0.000 | 0.000 | −10.034 | 0.000 | 0.000 | −2.420 | −0.992 | 0.398 | −0.449 | 0.000 | 0.000 | −21.513 | −6.544 |
| 4th-order Coeffient(A) | −0.016 | −0.141 | −0.255 | −0.120 | −0.103 | −0.068 | −0.021 | −0.018 | 0.067 | 0.041 | −0.103 | −0.118 | −0.141 | −0.087 |
| 6th-order Coeffient(B) | 0.007 | 0.245 | 0.526 | 0.324 | 0.006 | −0.026 | 0.032 | 0.029 | 0.007 | 0.024 | 0.004 | 0.028 | 0.025 | 0.026 |
| 8th-order Coeffient(C) | −0.063 | −0.369 | −0.643 | −0.354 | −0.028 | 0.011 | −0.016 | −0.011 | −0.002 | 0.005 | 0.016 | −0.003 | 0.004 | −0.005 |
| 10th-order Coeffient(D) | 0.073 | 0.286 | 0.474 | 0.220 | 0.022 | −0.018 | 0.011 | −0.001 | 0.001 | −0.005 | −0.011 | 0.000 | −0.001 | 0.000 |
| 12th-order Coeffient(E) | −0.063 | −0.125 | −0.171 | −0.049 | −0.020 | 0.023 | 0.001 | 0.002 | −0.001 | 0.000 | 0.002 | 0.000 | 0.000 | 0.000 |
| 14th-order Coeffient(F) | 0.012 | 0.018 | 0.021 | 0.000 | 0.015 | −0.009 | −0.001 | 0.000 | 0.000 | 0.000 | 0.000 | 0.000 | 0.000 | 0.000 |
| 16th-order Coeffient(G) | | | | | | | | | | | | | | |
| 18th-order Coeffient(H) | | | | | | | | | | | | | | |
| 20th-order Coeffient(J) | | | | | | | | | | | | | | |

The lens module according to the sixth exemplary embodiment (Example 6) of the present disclosure will be described with reference to FIGS. 16 through 18.

The lens module 100 according to this exemplary embodiment may include a first lens 10, a second lens 20, a third lens 30, a fourth lens 40, a fifth lens 50, a sixth lens 60, and a seventh lens 70. The lens module 100 may further include an infrared cut-off filter 80 and an image sensor 90. Further, the lens module 100 may further include at least one aperture stop (not shown). The aperture stop (not shown) may be arranged in front of the first lens 10 or anywhere between the first lens 10 and the seventh lens 70. For reference, an overall focal length f of the lens module 100 may be 4.165 [mm], a focal length of the first lens 10 may be 3.794, a focal length of the second lens 20 may be −8.619, a focal length of the third lens 30 may be −341.847, a focal length of the fourth lens 40 may be 96.237, a focal length of the fifth lens 50 may be 3.198, a focal length of the sixth lens 60 may be −11.131, and a focal length of the seventh lens 70 may be −4.635.

Table 11 below shows radii of curvature of the lenses, thicknesses of the lenses or distances between the lenses, refractive indices of the lenses, and abbe numbers of the lenses. Table 12 below indicates an aspheric constant of each surface of the lenses.

In this exemplary embodiment, the first lens 10 may have positive refractive power. Both surfaces of the first lens 10 may be convex. The second lens 20 may have negative refractive power. Both surfaces of the second lens 20 may be concave. The third lens 30 may have negative refractive power. A first surface of the third lens 30 may be convex, and a second surface thereof may be concave. The fourth lens 40 may have positive refractive power. A first surface of the fourth lens 40 may be convex, and a second surface thereof may be concave. The fifth lens 50 may have positive refractive power. A first surface of the fifth lens 50 may be concave, and a second surface thereof may be convex. That is, the fifth lens 50 may have a meniscus shape in which it is convex toward the image side. The sixth lens 60 may have negative refractive power. A first surface of the sixth lens 60 may be concave, and a second surface thereof may be convex. The seventh lens 70 may have negative refractive power. A first surface of the seventh lens 70 may be convex, and a second surface thereof may be concave. Further, the seventh lens 70 may have an inflection point formed on the second surface thereof.

The exemplary embodiment of the lens module configured as described above may have MTF characteristics and aberration characteristics as shown in FIGS. 17 and 18, respectively.

TABLE 11

| Example 6 | Radius of Curvature | Thickness/ Distance | Reflactive Index | Abbe number |
|---|---|---|---|---|
| Object | Infinity | Infinity | | |
| 1 | Infinity | 0.050 | | |
| 2 | 2.143 | 0.439 | 1.544 | 56.1 |
| 3 | −51.915 | 0.111 | | |
| 4 | −52.701 | 0.224 | 1.635 | 24.0 |
| 5 | 6.117 | 0.345 | | |
| 6 | 4.745 | 0.289 | 1.544 | 56.1 |
| 7 | 4.527 | 0.196 | | |
| 8 | 6.434 | 0.310 | 1.635 | 24.0 |
| 9 | 7.057 | 0.252 | | |
| 10 | −4.163 | 0.578 | 1.544 | 56.1 |
| 11 | −1.287 | 0.194 | | |
| 12 | −1.732 | 0.300 | 1.635 | 24.0 |
| 13 | −2.448 | 0.221 | | |
| 14 | 2.768 | 0.664 | 1.544 | 56.1 |
| 15 | 1.208 | 0.489 | | |
| 16 | Infinity | 0.300 | 1.517 | 64.2 |
| 17 | Infinity | 0.515 | | |
| Image | | | | |

TABLE 12

| Example 6 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Y Radius | 2.143 | −51.915 | −52.701 | 6.117 | 4.745 | 4.527 | 6.434 | 7.057 | −4.163 | −1.287 | −1.732 | −2.448 | 2.768 | 1.208 |
| Conic Constant (K) | 0.000 | 0.000 | 0.000 | −75.000 | 0.000 | 0.000 | −50.000 | 25.000 | 7.020 | −0.330 | 0.000 | 0.000 | −24.215 | −4.495 |
| 4th-order Coeffient(A) | −0.020 | −0.129 | −0.233 | −0.146 | −0.123 | −0.105 | −0.141 | −0.121 | 0.037 | 0.059 | 0.042 | 0.016 | −0.074 | −0.052 |
| 6th-order Coeffient(B) | 0.017 | 0.221 | 0.516 | 0.312 | 0.017 | −0.004 | 0.014 | 0.000 | −0.029 | 0.012 | −0.002 | 0.006 | 0.004 | 0.013 |
| 8th-order Coeffient(C) | −0.078 | −0.288 | −0.621 | −0.376 | −0.031 | −0.006 | −0.027 | −0.008 | −0.002 | −0.001 | 0.017 | 0.000 | 0.005 | −0.002 |
| 10th-order Coeffient(D) | 0.085 | 0.250 | 0.417 | 0.197 | 0.007 | −0.028 | 0.004 | −0.001 | 0.002 | 0.000 | −0.009 | 0.001 | −0.001 | 0.000 |
| 12th-order Coeffient(E) | −0.043 | −0.205 | −0.200 | −0.047 | −0.019 | 0.017 | 0.000 | 0.002 | 0.003 | 0.003 | 0.002 | 0.000 | 0.000 | 0.000 |
| 14th-order Coeffient(F) | −0.019 | 0.064 | 0.049 | 0.000 | 0.009 | −0.007 | −0.002 | 0.000 | 0.000 | 0.000 | 0.000 | 0.000 | 0.000 | 0.000 |
| 16th-order Coeffient(G) | | | | | | | | | | | | | | |
| 18th-order Coeffient(H) | | | | | | | | | | | | | | |
| 20th-order Coeffient(J) | | | | | | | | | | | | | | |

The lens module according to the seventh exemplary embodiment (Example 7) of the present disclosure will be described with reference to FIGS. 19 through 21.

The lens module 100 according to this exemplary embodiment may include a first lens 10, a second lens 20, a third lens 30, a fourth lens 40, a fifth lens 50, a sixth lens 60, and a seventh lens 70. The lens module 100 may further include an infrared cut-off filter 80 and an image sensor 90. Further, the lens module 100 may further include at least one aperture stop (not shown). The aperture stop (not shown) may be arranged in front of the first lens 10 or anywhere between the first lens 10 and the seventh lens 70. For reference, an overall focal length f of the lens module 100 may be 4.000 [mm], a focal length of the first lens 10 may be 3.907, a focal length of the second lens 20 may be −9.478, a focal length of the third lens 30 may be −415.933, a focal length of the fourth lens 40 may be 986.711, a focal length of the fifth lens 50 may be 3.042, a focal length of the sixth lens 60 may be −10.825, and a focal length of the seventh lens 70 may be −4.979.

Table 13 below shows radii of curvature of the lenses, thicknesses of the lenses or distances between the lenses, refractive indices of the lenses, and abbe numbers of the lenses. Table 14 below indicates an aspheric constant of each surface of the lenses.

In this exemplary embodiment, the first lens 10 may have positive refractive power. Both surfaces of the first lens 10 may be convex. The second lens 20 may have negative refractive power. Both surfaces of the second lens 20 may be concave. The third lens 30 may have negative refractive power. A first surface of the third lens 30 may be convex, and a second surface thereof may be concave. The fourth lens 40 may have positive refractive power. A first surface of the fourth lens 40 may be convex, and a second surface thereof may be concave. The fifth lens 50 may have positive refractive power. A first surface of the fifth lens 50 may be concave, and a second surface thereof may be convex. That is, the fifth lens 50 may have a meniscus shape in which it is convex toward the image side. The sixth lens 60 may have negative refractive power. A first surface of the sixth lens 60 may be concave, and a second surface thereof may be convex. The seventh lens 70 may have negative refractive power. A first surface of the seventh lens 70 may be convex, and a second surface thereof may be concave. Further, the seventh lens 70 may have an inflection point formed on the second surface thereof.

The exemplary embodiment of the lens module configured as described above may have MTF characteristics and aberration characteristics as shown in FIGS. 20 and 21, respectively.

TABLE 13

| Example 7 | Radius of Curvature | Thickness/ Distance | Reflactive Index | Abbe number |
|---|---|---|---|---|
| Object | Infinity | Infinity | | |
| 1 | Infinity | 0.05 | | |
| 2 | 2.158 | 0.415 | 1.544 | 56.1 |
| 3 | −135.165 | 0.100 | | |
| 4 | −252.549 | 0.220 | 1.635 | 24.0 |
| 5 | 6.167 | 0.372 | | |
| 6 | 5.119 | 0.298 | 1.544 | 56.1 |
| 7 | 4.903 | 0.165 | | |
| 8 | 7.230 | 0.313 | 1.635 | 24.0 |
| 9 | 7.191 | 0.238 | | |
| 10 | −4.289 | 0.634 | 1.544 | 56.1 |
| 11 | −1.256 | 0.100 | | |
| 12 | −1.725 | 0.221 | 1.635 | 24.0 |
| 13 | −2.419 | 0.221 | | |
| 14 | 2.586 | 0.744 | 1.544 | 56.1 |
| 15 | 1.189 | 0.527 | | |
| 16 | Infinity | 0.300 | 1.517 | 64.2 |
| 17 | Infinity | 0.515 | | |
| Image | | | | |

TABLE 14

| Example 7 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| Y Radius | 2.158 | −135.165 | −252.549 | 6.167 | 5.119 | 4.903 | 7.230 | 7.191 | −4.289 | −1.256 | −1.725 | −2.419 | 2.586 | 1.189 |
| Conic Constant (K) | 0.000 | 0.000 | 0.000 | −75.000 | 0.000 | 0.000 | −50.000 | 25.000 | 7.250 | −0.377 | 0.000 | 0.000 | −18.411 | −4.222 |
| 4th-order Coefficient(A) | −0.019 | −0.129 | −0.226 | −0.138 | −0.130 | −0.118 | −0.150 | −0.119 | 0.040 | 0.055 | 0.049 | 0.017 | −0.074 | −0.050 |
| 6th-order Coefficient(B) | 0.015 | 0.224 | 0.511 | 0.303 | 0.024 | 0.007 | 0.017 | 0.002 | −0.032 | 0.014 | −0.005 | 0.007 | 0.005 | 0.012 |
| 8th-order Coefficient(C) | −0.079 | −0.295 | −0.628 | −0.377 | −0.037 | −0.008 | −0.024 | −0.008 | −0.001 | −0.003 | 0.017 | 0.000 | 0.004 | −0.002 |
| 10th-order Coefficient(D) | 0.089 | 0.233 | 0.415 | 0.199 | 0.003 | −0.031 | 0.005 | 0.000 | 0.001 | −0.001 | −0.009 | 0.001 | −0.001 | 0.000 |
| 12th-order Coefficient(E) | −0.050 | −0.206 | −0.204 | −0.046 | −0.023 | 0.016 | −0.001 | 0.002 | 0.002 | 0.003 | 0.002 | 0.000 | 0.000 | 0.000 |
| 14th-order Coefficient(F) | −0.023 | 0.073 | 0.062 | 0.000 | 0.009 | −0.008 | −0.003 | 0.000 | 0.000 | 0.000 | 0.000 | 0.000 | 0.000 | 0.000 |
| 16th-order Coefficient(G) | | | | | | | | | | | | | | |
| 18th-order Coefficient(H) | | | | | | | | | | | | | | |
| 20th-order Coefficient(J) | | | | | | | | | | | | | | |

The lens modules according to first to seventh exemplary embodiments of the present disclosure configured as described above may satisfy Conditional Expression 1 to 8 as shown in Table 15 below and improve optical performance of the lenses.

TABLE 15

| Remark | Conditional Equation | Example 1 | Example 2 | Example 3 | Example 4 | Example 5 | Example 6 | Example 7 |
|---|---|---|---|---|---|---|---|---|
| 1 | 1.0 < f12/f < 2.0 | 1.455 | 1.318 | 1.405 | 1.181 | 1.906 | 1.472 | 1.526 |
| 2 | TTL/f < 1.40 | 1.211 | 1.223 | 1.229 | 1.279 | 1.216 | 1.318 | 1.362 |
| 3 | BFL/f > 0.2 | 0.272 | 0.239 | 0.270 | 0.218 | 0.247 | 0.317 | 0.339 |
| 4 | R1/f > 0.35 | 0.409 | 0.409 | 0.422 | 0.452 | 0.443 | 0.515 | 0.539 |
| 5 | −0.6 < (R11 − R12)/(R11 + R12) < 8.0 | −0.044 | 0.030 | 0.016 | 0.112 | 0.263 | −0.171 | −1.173 |
| 6 | −2.0 < R13/f < 1.0 | 0.517 | 0.704 | 0.486 | −1.383 | 0.618 | 0.665 | 0.647 |
| 7 | −10.0 < (R5 − R6)/(R5 + R6) < 14.0 | 5.868 | 5.966 | 7.673 | 1.372 | −1.611 | 0.023 | 0.022 |
| 8 | ANG/f > 15.0 | 16.101 | 115.258 | 16.438 | 17.715 | 16.264 | 18.647 | 20.350 |

As set forth above, according to exemplary embodiments of the present disclosure, aberration may be easily corrected and high resolution may be implemented.

While exemplary embodiments have been shown and described above, it will be apparent to those skilled in the art that modifications and variations could be made without departing from the spirit and scope of the present disclosure as defined by the appended claims. The illustrative discussions above are not intended to be exhaustive or to limit the invention to the precise forms disclose.

What is claimed is:
1. A lens module comprising:
a first lens having positive refractive power;
a second lens having refractive power;
a third lens having positive refractive power;

a fourth lens having refractive power;
a fifth lens having refractive power;
a sixth lens having positive refractive power; and
a seventh lens having negative refractive power, an image-side surface of the seventh lens having one or more inflection points,
wherein the first to seventh lenses are disposed in sequential order from the object side toward the image side, and
wherein a radius of curvature of an image-side surface of the sixth lens is greater than a radius of curvature of an object-side surface of the sixth lens.

2. The lens module of claim 1, wherein the second lens has negative refractive power.

3. The lens module of claim 1, wherein an object-side surface of the first lens is convex, and an image-side surface of the first lens is concave.

4. The lens module of claim 1, wherein an object-side surface of the second lens is convex, and an image-side surface of the second lens is concave.

5. The lens module of claim 1, wherein the object-side surface of the third lens is convex.

6. The lens module of claim 1, wherein an object-side surface of the sixth lens is convex.

7. The lens module of claim 1, wherein the image-side surface of the seventh lens is concave.

8. The lens module of claim 1, wherein at least one or more inflection points are formed on at least one of object-side and image-side surfaces of the sixth lens.

9. The lens module of claim 1, wherein at least one or more turning points are formed on at least one of object-side and image-side surfaces of the seventh lens.

10. The lens module of claim 1, wherein at least one of the first to seventh lenses is formed of plastic.

11. The lens module of claim 1, wherein at least one of object-side and image-side surfaces of at least one of the first to seventh lenses is aspheric.

12. The lens module of claim 1, wherein the lens module satisfies the following Conditional Expression:

$1.0 < f12/f < 2.0$ [Conditional Expression]

where f12 is a synthetic focal length of the first and second lenses, and f is an overall focal length of an optical system including the first to seventh lenses.

13. The lens module of claim 1, wherein the lens module satisfies the following Conditional Expression:

$TTL/f < 1.40$ [Conditional Expression]

where TTL is a distance from an object-side surface of the first lens to an image surface, and f is an overall focal length of an optical system including the first to seventh lenses.

14. The lens module of claim 1, wherein the lens module satisfies the following Conditional Expression:

$BFL/f > 0.2$ [Conditional Expression]

where BFL is a distance from the image-side surface of the seventh lens to an image surface, and f is an overall focal length of an optical system including the first to seventh lenses.

15. A lens module comprising:
a first lens having positive refractive power;
a second lens having refractive power;
a third lens having positive refractive power;
a fourth lens having refractive power;
a fifth lens having refractive power;
a sixth lens having refractive power and a concave image-side surface; and
a seventh lens having negative refractive power, both surfaces of the seventh lens being concave, and an image-side surface of the seventh lens having one or more inflection points,
wherein the first to seventh lenses are disposed in sequential order from the object side toward the image side.

16. The lens module of claim 15, wherein an object-side surface of the first lens is convex, and an image-side surface of the first lens is concave,
wherein an object-side surface of the second lens is convex, and an image-side surface of the second lens is concave, and
wherein the object-side surface of the third lens is convex.

17. The lens module of claim 15, wherein at least one or more inflection points are formed on at least one of object-side and image-side surfaces of the sixth lens.

18. The lens module of claim 15, wherein at least one or more turning points are formed on at least one of object-side and image-side surfaces of the seventh lens.

19. The lens module of claim 15, wherein the lens module satisfies the following Conditional Expression:

$1.0 < f12/f < 2.0$ [Conditional Expression]

where f12 is a synthetic focal length of the first and second lenses, and f is an overall focal length of an optical system including the first to seventh lenses.

20. The lens module of claim 15, wherein the lens module satisfies the following Conditional Expression:

$TTL/f < 1.40$ [Conditional Expression]

where TTL is a distance from an object-side surface of the first lens to an image surface, and f is an overall focal length of an optical system including the first to seventh lenses.

* * * * *